US012234723B2

(12) United States Patent
Mason et al.

(10) Patent No.: US 12,234,723 B2
(45) Date of Patent: Feb. 25, 2025

(54) OPTICAL FEEDTHROUGH SYSTEM CAP

(71) Applicant: ONESUBSEA IP UK LIMITED, London (GB)

(72) Inventors: Ian Mason, Leeds (GB); Phillip Theriot, Houston, TX (US); David Gwyn, Houston, TX (US); Gustavo Gonzalez, Houston, TX (US); Erik Wiest, Houston, TX (US)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 18/690,853

(22) PCT Filed: Sep. 20, 2022

(86) PCT No.: PCT/US2022/044101
§ 371 (c)(1),
(2) Date: Mar. 11, 2024

(87) PCT Pub. No.: WO2023/044147
PCT Pub. Date: Mar. 23, 2023

(65) Prior Publication Data
US 2024/0401474 A1    Dec. 5, 2024

Related U.S. Application Data

(60) Provisional application No. 63/245,944, filed on Sep. 20, 2021.

(51) Int. Cl.
*E21B 47/135*    (2012.01)
*E21B 33/076*    (2006.01)
(Continued)

(52) U.S. Cl.
CPC .......... *E21B 47/135* (2020.05); *E21B 33/076* (2013.01); *G02B 6/4428* (2013.01); *G02B 6/502* (2013.01)

(58) Field of Classification Search
CPC ... E21B 47/135; E21B 33/076; G02B 6/4428; G02B 6/502
See application file for complete search history.

(56) References Cited

U.S. PATENT DOCUMENTS 5,992,526 A    11/1999  Cunningham et al.
6,817,417 B2   11/2004  Blair
(Continued)

FOREIGN PATENT DOCUMENTS

| GB | 2346630 A | 8/2000 |
| GB | 2372062 A | 8/2002 |
| WO | 2017112788 A1 | 6/2017 |

OTHER PUBLICATIONS

International Search Report and Written Opinion issued in International Patent Application No. PCT/US2022/044101 on Jan. 11, 2023; 11 pages.
(Continued)

*Primary Examiner* — Aaron L Lembo
(74) *Attorney, Agent, or Firm* — Jeffrey D. Frantz

(57) ABSTRACT

A system includes a feedthrough cap having a guide funnel configured to extend about a tree body of a well system. The feedthrough cap includes a landing body configured to extend into the tree body and land on a hanger. The feedthrough cap includes a feedthrough line configured to extend through the feedthrough cap to the hanger.

19 Claims, 14 Drawing Sheets

(51) Int. Cl.
*G02B 6/44* (2006.01)
*G02B 6/50* (2006.01)

(56) References Cited

U.S. PATENT DOCUMENTS

| | | | | |
|---|---|---|---|---|
| 7,751,677 | B2 * | 7/2010 | Dunphy | G02B 6/4248 |
| | | | | 385/53 |
| 8,066,076 | B2 * | 11/2011 | Donald | E21B 33/0353 |
| | | | | 166/344 |
| 8,245,787 | B2 * | 8/2012 | White | E21B 33/0353 |
| | | | | 166/344 |
| 8,422,835 | B2 * | 4/2013 | Dunphy | G02B 6/24 |
| | | | | 385/12 |
| 9,534,466 | B2 | 1/2017 | Pathak | |
| 9,702,212 | B2 * | 7/2017 | Breda | E21B 43/129 |
| 9,784,063 | B2 | 10/2017 | June | |
| 9,915,118 | B2 | 3/2018 | Moe | |
| 9,926,760 | B1 | 3/2018 | Santilli | |
| 10,030,509 | B2 * | 7/2018 | Mulholland | E21B 33/03 |
| 11,486,215 | B2 * | 11/2022 | Park | E21B 47/135 |
| 11,927,093 | B1 * | 3/2024 | Jaaskelainen | G01H 9/004 |
| 11,927,473 | B2 * | 3/2024 | Wilson | G01H 9/004 |
| 11,946,365 | B2 * | 4/2024 | Wilson | H04J 14/02 |
| 2008/0210435 | A1 | 9/2008 | Goonetilleke | |
| 2009/0071656 | A1 | 3/2009 | Shaw | |
| 2011/0048726 | A1 | 3/2011 | Aarnes | |
| 2015/0275608 | A1 | 10/2015 | Breda | |
| 2016/0002997 | A1 | 1/2016 | Farias | |
| 2018/0320469 | A1 | 11/2018 | June | |
| 2021/0156214 | A1 | 5/2021 | Thomas | |
| 2022/0412821 | A1 * | 12/2022 | Jaaskelainen | E21B 47/135 |
| 2023/0332497 | A1 * | 10/2023 | McGuigan | E21B 47/01 |

OTHER PUBLICATIONS

International Preliminary Report on Patentability of International Patent Application No. PCT/US2022/044101 dated Apr. 4, 2024, 7 pages.

* cited by examiner

OPTICAL FEEDTHROUGH SYSTEM CAP

CROSS-REFERENCE TO RELATED APPLICATION

This application is a National Stage Entry of International Application No. PCT/US2022/044101, filed Sep. 20, 2022, which claims priority to and the benefit of U.S. Provisional Application No. 63/245,944, entitled "OPTICAL FEEDTHROUGH SYSTEM CAP," filed Sep. 20, 2021, which is hereby incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

The present disclosure generally relates to systems and methods for feedthrough connections in a subsea system. In particular, the present disclosure relates to a feedthrough system allowing an introduction of feedthrough connections and communications into a subsea well system.

Hydrocarbon fluids such as oil and natural gas are obtained from a subterranean geologic formation, referred to as a reservoir, by drilling a well that penetrates the hydrocarbon-bearing geologic formation. In subsea applications, the well is drilled at a subsea location and the flow of fluids may be handled by several different types of equipment. In subsea operations, for example, the subsea equipment may include a subsea completion system, which may include or work in cooperation with a subsea installation system mounted over a wellhead. The subsea installation system may include various components (e.g., a subsea tree, a tubing hanger, a tubing head spool, and so on) and may incorporate fluid flow paths (e.g., a production flow path and an annulus flow path). The wellhead may be positioned over the well in which production tubing is suspended from the tubing hanger located at the tubing head spool. A tree cap may be placed on a subsea tree to cap off flow passages within the subsea tree and to provide a final barrier with respect to the surrounding environment, or to prevent the ingress of debris into tree.

Typical feedthrough systems pass electrical or fiber optic signals from downhole, through the tubing hanger, and into the tree. Connections are made between the tubing hanger and tree to pass these signals. Some tree systems (such as horizontal tree systems) do not easily allow for connections (such as fiber optic connections) between the tree and tubing hanger.

Accordingly, a need exists for a tree cap that makes feedthrough connections with the tubing hanger, to bypass the difficult connections in some tree systems. Furthermore, there are advantages to such a tree cap having improved functionalities that may allow for retrofitting a subsea completion system with minimum or no disturbance on a subsea tree, thereby reducing the time and cost of installing a feedthrough system for monitoring a subsea well.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes a feedthrough cap having a top configured to extend across an axial opening of a tree body of a well system. The feedthrough cap includes a landing body that extends into the tree body. The feedthrough cap includes a feedthrough line configured to extend through the feedthrough cap.

In another embodiment, a system includes a feedthrough cap having a top configured to extend across an axial opening of a tree body of a well system. The feedthrough cap includes a landing body configured to move between a retracted position and an extended position relative to the top of the feedthrough cap, wherein the extended position is configured to extend into the tree body. The feedthrough cap includes one or more feedthrough lines configured to extend through the top of the feedthrough cap, wherein the one or more feedthrough lines include one or more fiber optic feedthrough lines, one or more electrical feedthrough lines, or a combination thereof.

In yet another embodiment, a method includes positioning a top of a feedthrough cap across an axial opening of a tree body of a well system. The method further includes moving a landing body between a retracted position and an extended position relative to the top of the feedthrough cap, wherein the extended position is configured to extend into the tree body. The method further includes extending one or more feedthrough lines through the top of the feedthrough cap, wherein the one or more feedthrough lines include one or more fiber optic feedthrough lines, one or more electrical feedthrough lines, or a combination thereof.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
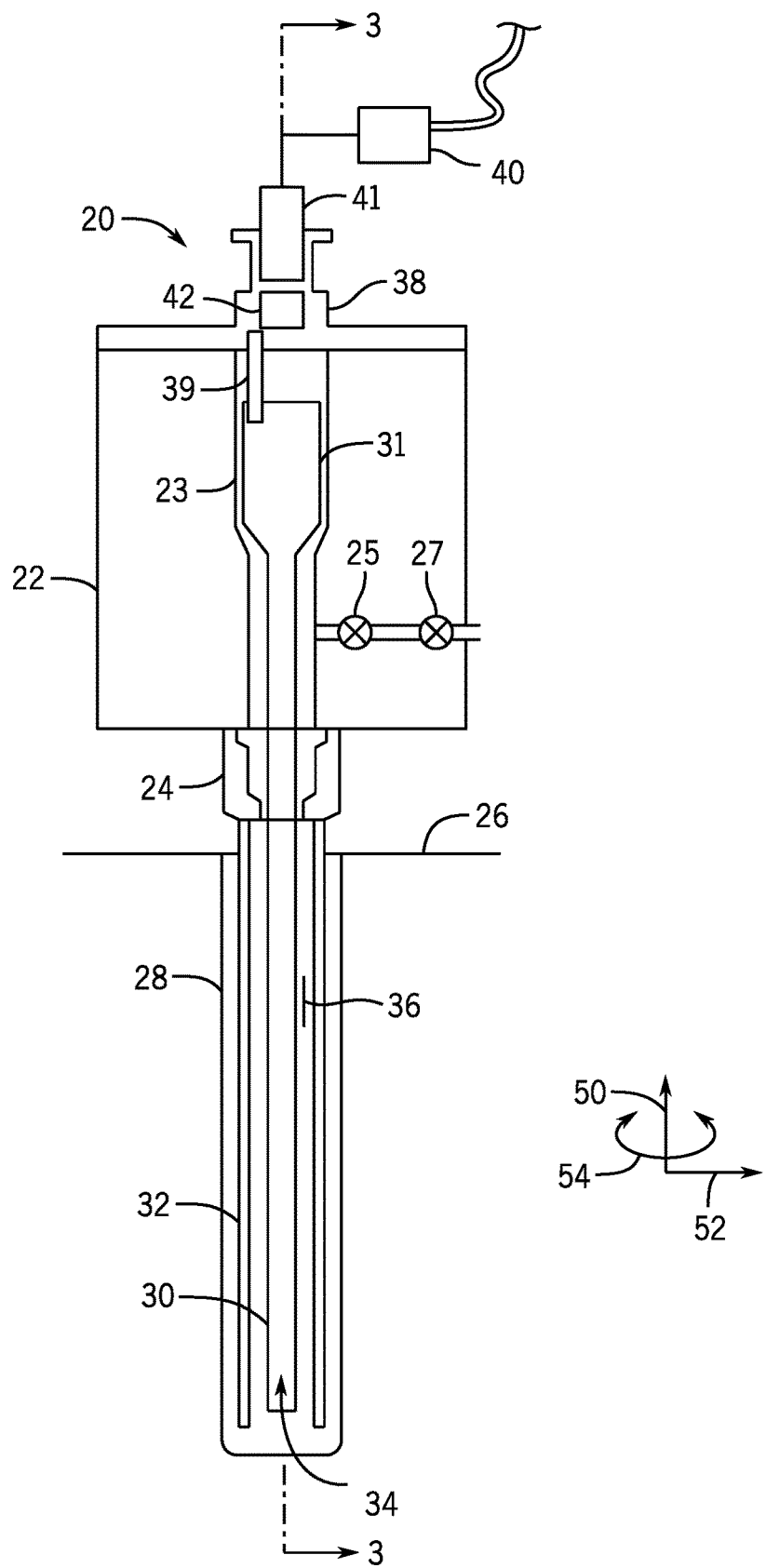
FIG. 1 is a schematic diagram of an embodiment of a subsea well system for use in a well operation.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

When introducing elements of various embodiments of the present invention, the articles "a," "an," "the," and "said" are intended to mean that there are one or more of the elements. The terms "comprising," "including," and "having" are used in an open-ended fashion, and thus should be interpreted to mean "including, but not limited to." Also, any use of any form of the terms "connect," "engage," "couple," "attach," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name, but not function.

In certain embodiments, as discussed in further detail below, a subsea tree with a feedthrough system (e.g., Electrical Feedthrough System (EFS), Optical Feedthrough System (OFS)) cap may be to allow an introduction of feedthrough connections into the subsea tree (e.g., horizontal subsea tree) in a subsea completion system without impacting the main subsea tree body. The feedthrough system cap (e.g., EFS cap, OFS cap) may be suitable for subsea tree developments in new wells. Additionally, or alternatively, the feedthrough system cap may also be integrated into brownfield wells currently producing with existing subsea trees.

In contrast to the disclosed embodiments, in tree systems such as the horizontal tree system, feedthrough systems may be passed through a horizontal penetration system through the tree body into the tubing hanger. In the disclosed embodiments, as discussed in further detail below, the OFS cap may provide additional downhole functions directly through a tubing hanger, bypassing the tree body. Furthermore, the OFS cap may be installed using a remotely operated vehicle (ROV) in a subsea environment. This may result in a low-cost installation method, especially when considered for deep water developments where the use of dedicated installation tooling and vessels may add significant costs.

As discussed below, the OFS cap may be used in subsea horizontal tree systems. For instance, a wet-mate OFS plug located on a bottom of the OFS cap may connect to a corresponding receptacle located in a top of the tubing hanger, where a dedicated drilling may pass a communication line (e.g., fiber-optic cable) through the tubing hanger and downhole into a completion system. Passing the communication line through the tubing hanger and not the tree body may allow for retrofit completion changeouts for existing wells without disturbing the tree. In certain embodiments, the feedthrough system cap may be used to incorporate additional third-party feedthrough system (e.g., optical systems and/or traditional electrical feedthrough systems), giving the ability to further enhance completion/reservoir monitoring for new and existing well developments.

With the forgoing in mind, FIG. 1 is a schematic diagram of a subsea well system 20 (e.g., hydrocarbon well system) having a feedthrough system cap with various improvements as discussed in further detail below. The illustrated embodiment is intended as only one possible non-limiting example for the feedthrough system cap (e.g., tree cap 38) that has the unique features described herein. As appreciated, the feedthrough system cap (e.g., tree cap 38) described herein may be mounted in any suitable component of the subsea well system 20, and thus the following discussion of FIG. 1 is intended to provide one possible context for the feedthrough system cap (e.g., tree cap 38). Accordingly, prior to a detailed discussion of the tree cap 38 improvements, the subsea well system 20 and its components are discussed to provide context for the tree cap 38. The subsea well system 20 may be configured to extract various natural resources, such as minerals and hydrocarbons (e.g., oil and/or natural gas), from the earth. Additionally or alternatively, the subsea well system 20 may be configured to inject substances (e.g., water, carbon dioxide, chemicals) into the earth.

As shown, the subsea well system 20 may include a variety of components, such as a subsea tree 22 (e.g., a horizontal subsea tree) positioned over a wellhead 24 at a subsea surface/mudline 26. The subsea tree 22 (sometimes referred to in the oil and gas industry as a Christmas tree) may include a variety of flow paths (e.g., bores), valves, fittings, and controls for operating a well 28. For instance, the subsea tree 22 may include a frame that is disposed about a tree body, a flow-loop, actuators, and valves. Further, the subsea tree 22 may be in fluid communication with the well 28. As illustrated, a production bore 23 extends through the subsea tree 22, a tubing hanger 31, and production tubing 30. The production bore 23 provides for completion and workover procedures, such as the insertion of tools into the wellhead 24, the injection of various chemicals into the well 28, and the like. Further, natural resources extracted from the well 28 (e.g., oil and/or natural gas) may be regulated and routed via the subsea tree 22. For instance, the subsea tree 22 include various valves, such as a production master valve (PMV) 25, a production wing valve (PWV) 27, and other valves (e.g., annulus swap valve, workover valve, annulus access valve, cross-over valve, annulus wing valve, annulus master valve, surface-controlled subsurface safety valve, and so on). In some embodiments, the subsea tree 22 may be coupled to a jumper or a flowline that is tied back to other components, such as a manifold. Accordingly, extracted natural resources flow from the well 28 to the manifold via the subsea tree 22 before being routed to shipping or storage facilities.

The wellhead 24 may be positioned over the well 28 in which the production tubing 30 is suspended from the tubing hanger 31. The wellhead 24 may include multiple components that control and regulate activities and conditions associated with the well 28. For example, the wellhead 24 may include bodies, valves, and seals that route extracted natural resources from a resource deposit, provide for regulating pressure in the well 28, and/or provide for the injection of the substances into the earth.

In the illustrated example, the production tubing 30 and a well casing 32 establish flow passages, such as a subsurface production flow passage 34 and an annulus flow passage 36. The production flow passage 34 and the annulus flow passage 36 are continued up through the subsea tree 22 and fluid flow therethrough may be controlled via corresponding valves (e.g., annulus gate valves and production gate valves). In some wells 28, the annulus flow passage 36 is between the production tubing 30 and well casing 32 and is concentrically located about the production flow passage 34 within production tubing 30.

In the embodiment illustrated, the subsea well system 20 may also include a tree cap 38, which may be releasably deployed into engagement with the subsea tree 22 via a remotely operated vehicle (ROV) 40 having an ROV manipulator 41. The ROV manipulator 41 may facilitate an installation of the tree cap 38. The subsea well system 20 may further include an interface component 42 that may provide connections and/or communications between the ROV manipulator 41 and the subsea well system 20 to facilitate an installation of a feedthrough system (e.g., optical, electrical, or optical and electrical hybrid feedthrough system) on the tree cap 38. Additional details of the installation of the feedthrough system are described below with respect to FIGS. 2-14. To facilitate discussion, the subsea well system 20 and its components may be described with reference to an axial axis or direction 50, a radial axis or direction 52, and a circumferential axis or direction 54.

As mentioned above, the tree cap 38 may include an optical feedthrough system (OFS) allowing an introduction of various optical feedthrough connections or communications into the subsea tree 22 without impacting the main subsea tree body. The tree cap 38 with the optical feedthrough system may provide deployment of fiber-optic systems for multi-function downhole sensing. For instance, a wet-mate OFS plug located on the bottom of the tree cap 38 connects to a corresponding receptacle located in a top of the tubing hanger 31 where a dedicated drilling passes a communication line (e.g., fiber-optic cable) through the main subsea tree body and downhole into the completion. Passing the OFS line through the tubing hanger 31 and not the main subsea tree body allows for retrofit completion changeouts for existing wells without disturbing the subsea tree 22. In other words, the tree cap 38 may be used in any existing horizontal tree system if a compatible tubing hanger is in place in the tree and a compatible tubing hanger may be retrofitted onto the existing tree.

Though shown herein deployed in a horizontal tree, the tree cap 38 may be deployed in brownfield wells currently producing with a horizontal tree system. In certain embodiments, the tree cap 38 with the feedthrough system (optical and/or electrical feedthrough system) may be deployed (e.g., with corresponding modifications) in a vertical Christmas tree system. It should be noted that the components described above with regard to the subsea well system 20 are examples and the subsea well system 20 may include additional or fewer components relative to the illustrated embodiment. Embodiments with various implementations of the tree cap 38 are discussed in further detail below. For instance, FIGS. 2-5 illustrate a fixed lower body embodiment of the tree cap 38, FIGS. 6-9 illustrate an extensible lower body embodiment of the tree cap 38, and FIGS. 10-14 illustrate another extensible lower body embodiment of the tree cap 38.

Figure 2:
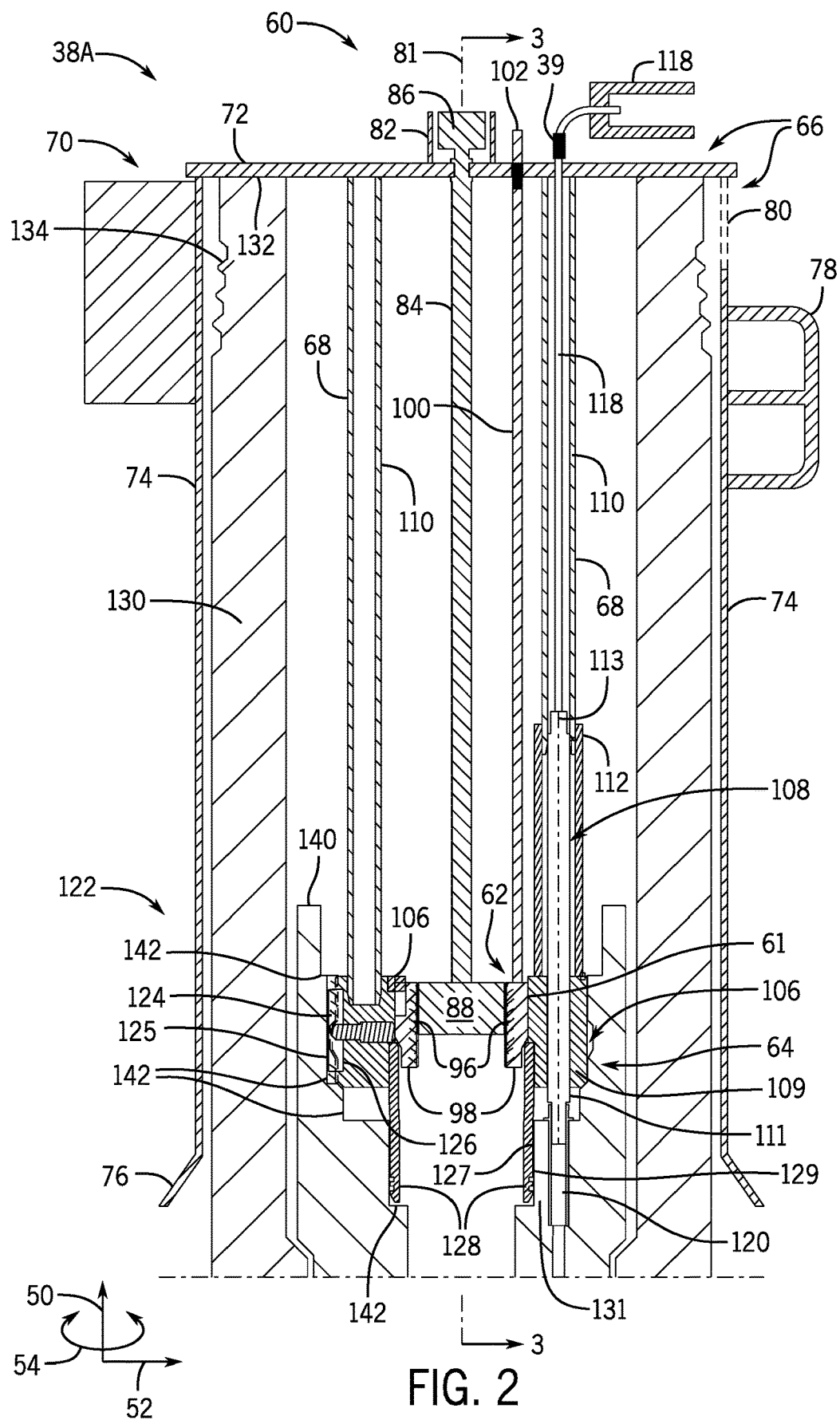
FIG. 2 is a cross-sectional view of an embodiment of a subsea tree with a feedthrough system cap.

FIG. 2 is a cross-sectional view of an embodiment of a subsea tree 22 with a feedthrough system cap 38A. The feedthrough system cap 38A includes an actuation assembly or actuator 60, an energizing assembly or energizer 62, a locking assembly or lock 64 (e.g., internal landing lock), a monitoring system or monitor 66, a protective feedthrough sleeve 68, a guide funnel 70 (e.g., annular guide funnel), and a landing body 106 (e.g., central annular landing body). As discussed in further detail below, the actuator 60 is configured to actuate the energizer 62, which in turn energizes the lock 64 to move between locked and unlocked positions relative to the subsea tree 22. The monitor 66 is configured to help monitor the landing, actuating, energizing, and locking of the feedthrough system cap 38A relative to the subsea tree 22. The protective feedthrough sleeve 68 is configured to protect a feedthrough cable or line, which passes through the feedthrough system cap 38A into the subsea tree 22. The protective feedthrough sleeve 68 also connects the landing body 106 to the guide funnel 70. The actuator 60, the energizer 62, the lock 64, and the landing body 106 may be disposed substantially or entirely inside of the guide funnel 70 and inside of the subsea tree 22, while the guide funnel 70 is configured to be disposed outside of the subsea tree 22. The actuator 60 may be configured to actuate the energizer 62 via a rotational drive, an axial drive, or a combination thereof, to provide rotational and/or axial motion to move the energizer 62. The energizer 62 may be configured to move axially and/or rotationally to energize the lock 64. As discussed below, the energizer 62 may be guided in an axial direction to move only axially in response to rotational motion of the actuator 60. The lock 64 may be a radial lock with one or more radial locking elements, which are configured to move radially between locked and unlocked positions relative to the subsea tree 22. The landing body 106 may be an annular landing body supporting the lock 64 and the energizer 62. For example, as discussed below, the energizer 62 may be coupled to the landing body 106 via one or more axial guides 61, which enable axial movement of the energizer 62 relative to the landing body 106 while blocking rotational movement of the energizer 62 relative to the landing body 106. The lock 64 also may be coupled to the landing body 106 and configured to move radially relative to the landing body 106 in response to movement of the energizer 62. Various details of the feedthrough system cap 38A are discussed below.

The guide funnel 70 may provide alignment and protection for various components (e.g., the landing body 106, interface component 42, optical and/or electrical connectors) during an installation of the feedthrough system cap 38A on the subsea tree 22. A connector 39 (e.g., feedthrough line connector) is positioned on the guide funnel 70, thereby providing a connection for the feedthrough lines deployed in the subsea tree 22. The feedthrough lines may include electrical lines, optical lines, data and communication lines, fluid lines (e.g., liquid and/or gas lines), sensor lines, control lines, hybrid lines, or any combination thereof. The guide funnel 70 may be adapted for interface with the ROV 40 and the ROV manipulator 41 via the interface component 42.

The guide funnel 70 includes a top 72 (e.g., flat circular top plate, cover, or cap) and a side wall 74 (e.g., annular side wall). In some cases, the guide funnel 70 may include a tapered bottom 76 (e.g., bent away from an outer surface of the subsea tree 22). For example, the tapered bottom 76 may include a diverging annular wall, such as a frustoconical wall, which increases in diameter axially away from the side wall 74 to define an enlarged opening. The tapered bottom 76 also may be described as a tapered entry guide or a tapered alignment guide, because the diverging annular wall accommodates some misalignment when lowering the guide funnel 70 onto the subsea tree 22. The guide funnel 70 also includes a handle 78 (e.g., U-shaped or E-shaped handle) allowing the ROV 40 to carry (e.g., via a robotic arm) the feedthrough system cap 38A during the installation of the feedthrough system cap 38A. Moreover, the guide funnel 70 includes a viewing window 80, which may be part of the monitor 66, to allow a user (e.g., operator of the ROV 40) to determine (e.g., via a camera, optical sensor, position sensor, contact sensor, etc.) whether the feedthrough system cap 38A is fully landed (e.g., on top of the subsea tree 22). The viewing window 80 may include one or more openings, such as circular or rectangular openings, at one or more locations to enable monitoring of the landing, actuating by the actuator 60, energizing by the energizer 62, and/or locking by the lock 64. For example, the viewing window 80 may include an opening at the top 72 and/or the side wall 74 adjacent an intersection between the top 72 and the side wall 74. In operation, the viewing window 80 enables the user to observe a relative position between the feedthrough system cap 38A and the top of the subsea tree 22 and determine whether the feedthrough system cap 38A is fully landed. In some cases, a processing unit (e.g., a processor with artificial intelligence) may process sensor feedback of the positions of the feedthrough system cap 38A and the top of the subsea tree 22 and automatically determine whether the feedthrough system cap 38A is fully landed.

In the illustrated embodiment, the guide funnel 70 includes an adapter 82 coupled to the top plate 72 in a central location to facilitate movement of the actuator 60. The illustrated actuator 60 includes a central shaft 84 coupled to a top drive portion 86 and a bottom actuating portion 88. The central shaft 84 is positioned inside the guide funnel 70 along a central axis 81 parallel to the axial axis 50. A top drive portion 86 is positioned at least partially inside the adapter 82 and may be rotated hydraulically or mechanically (e.g., controlled by the ROV 40), causing a rotation of the central shaft 84 around the central axis 81. In certain embodiments, the top drive portion 86 includes a torque tool interface (e.g., a plurality of flats arranged in a square, a pentagon, or a hexagon) configured to engage with a corresponding torque tool interface of a torque tool of the ROV 40. However, in some embodiments, the top drive portion 86 may include a torque tool. The torque tool of the ROV 40 or the top drive portion 86 may include an electric motor driven torque tool or a hydraulically driven torque tool. In operation, the torque tool is configured to rotate the central shaft 84 and the bottom actuating portion 88 of the actuator 60. However, the actuator 60 may not axially move the central shaft 84 and the bottom actuating portion 88 while rotating via the torque tool. The bottom actuating portion 88 (e.g., cylindrical body) of the central shaft 84 is configured to engage with the energizer 62 to energize the lock 64.

In the illustrated embodiment, the energizer 62 includes an energizing sleeve 98 (e.g., annular sleeve) coupled to the bottom actuating portion 88 at a threaded interface 96, wherein external threads of the bottom actuating portion 88 engage with internal threads of the energizing sleeve 98. In operation, the top drive portion 86 of the actuator 60 rotates the central shaft 84 and the bottom actuating portion 88, thereby driving axial movement of the energizing sleeve 98 via rotation of the bottom actuating portion 88 along the threaded interface 96. The axial position of the energizing sleeve 98 may be indicated by a side rod 100 (e.g., indicator rod of the monitor 66) coupled to the energizing sleeve 98 and extending through the top plate 72, wherein the side rod 100 is positioned at a radial offset distance (e.g., in the radial direction 52) from the central shaft 84. The energizing sleeve 98 is coupled to the landing body 106 via the one or more axial guides 61, which enables relative axial movement of the energizing sleeve 98 relative to the landing body 106 while blocking relative rotational movement of the energizing sleeve 98 relative to the landing body 106. Each axial guide 61 may include an axial protrusion disposed in an axial slot, wherein the axial protrusion and the axial slot are oriented in the axial direction 50 along the central axis 81. The axial guides 61 also may limit the axial movement to an axial range or path of travel sufficient for energizing the lock 64, while blocking axial separation between the energizing sleeve 98 and the landing body 106. Accordingly, as the top drive portion 86 of the actuator 60 rotates the central shaft 84, the bottom actuating portion 88 rotates along the threaded interface 96 with the energizing sleeve 98 while the axial guides 61 block rotation of the energizing sleeve 98, and thus the energizing sleeve 98 moves axially along the axial guides 61 to energize radial movement of the lock 64. As discussed in further detail below with reference to FIG. 3, the lock 64 may include a plurality of radial locking elements extending through the landing body 106 to lock with the subsea tree 22.

An indicator 102 (e.g., tip indicator of monitor 66) may be positioned on top of the side rod 100 and through the top 72 of the guide funnel 70. The indicator 102 may include one or more indicators using color indicators, text indicators, positional index indicators (e.g., a series of flat marks), or any combination thereof. In certain embodiments, the indicator 102 may indicate a position of the landing body 106 (e.g., when fully landed in the subsea tree 22), a position of the energizer 62 (e.g., energizing sleeve 98) indicating whether the lock 64 is energized into a locked position relative to the subsea tree 22, or a combination thereof. The indicator 102 may be viewed through the viewing window 80 of the monitor 66, along the top 72 of the guide funnel 70, or a combination thereof, using a monitoring system (e.g., camera, optical sensor, position sensor, contact sensor, etc.). The monitoring system may be coupled to the feedthrough system cap 38A and/or the ROV 40. Accordingly, the indicator 102 may indicate the position of the side rod 100, the energizer 62 (e.g., energizing sleeve 98), the lock 64, and/or the landing body 106 to the monitoring system, such that the user (e.g., operator of the ROV 40) may determine the current status of landing, actuating, energizing, and/or locking of the feedthrough system cap 38A relative to the subsea tree 22.

The protective feedthrough sleeve 68 may include a sleeve portion 110 coupled to the top 72 of the guide funnel 70, a sleeve portion 112 coupled to the landing body 106, and a sleeve passage 109 disposed through the landing body 106. The sleeve portion 110, the sleeve portion 112, and the sleeve passage 109 are axially in line and coupled together to pass and protect a feedthrough line 118 from the connector 39 to the subsea tree 22. The feedthrough line 118 may include one or more optical lines, such as a fiber optic line. However, the feedthrough line 118 may include one or more electrical lines, data and communication lines, fluid lines (e.g., liquid and/or gas lines), sensor lines, control lines, hybrid lines, optical lines, or any combination thereof. The feedthrough line 118 may include a line connector 108, such as a removable line coupling. For example, the line connector 108 may extend through the sleeve portion 112 and the sleeve passage 109 to facilitate a removable connection of the feedthrough line 118 with the feedthrough system cap 38A and the subsea tree 22. For example, the line connector 108 may include one or more connector portions (e.g., connector portions 111 and 113), wherein the connector portion 111 is configured to removably couple with a mating connector portion 120 in the subsea tree 22, and the connector portion 113 (if included) is configured to couple with the feedthrough line 118 in the sleeve portion 110. The line connector 108, including the connector portions 111, 113, and 120, may include electrical connectors, optical connectors, fluid connectors, or any combination thereof. In certain embodiments, the connector portions 111, 113, and/or 120 include male couplings (e.g., plug), female couplings (e.g., plug receptacles), or a combination thereof. In some embodiments, the line connector 108 includes a wet-mate optical feedthrough system (OFS) plug configured to couple with the connector portion 120 (e.g., mating OFS receptacle) in the tubing hanger 31. Thus, the feedthrough line 118 is configured to pass through the feedthrough system cap 38A and the tubing hanger 31 using the various connectors (e.g., line connector 108 and connector portion 120), wherein the feedthrough line 118 generally extends along the central axis 81 (e.g., in the axial direction 50) rather than in a radial direction 52 through a sidewall of the subsea tree 22.

In certain embodiments, the sleeve portions 110 and 112 are concentric with one another with one sleeve disposed about the other, such that the sleeve portions 110 and 112 are configured to move axially relative to one another to adjust an axial length of the protective feedthrough sleeve 68. For example, the sleeve portion 112 may be disposed about the sleeve portion 110, or vice versa. Additionally, in the illustrated embodiment, the line connector 108 extends through the sleeve portion 112 and partially extends into the sleeve portion 110, and the line connector 108 extends through the sleeve passage 109 and partially extends into the connector portion 120 in the subsea tree 22. The line connector 108 may enable axial adjustments of the feedthrough line 118, such that the sleeve portions 110 and 112 can move axially relative to one another to adjust an overall axial length of the protective feedthrough sleeve 68 while the line connector 108 axially adjusts the feedthrough line 118 to reduce the risk of damaging the feedthrough line 118. Additionally, the line connector 108 may axially move to help provide some flexibility when connecting with the connector portion 120 of the subsea tree 22, e.g., on top of the tubing hanger 31.

The feedthrough system cap 38A may include one or more alignment guides configured to align the feedthrough system cap 38A with the subsea tree 22, including alignment of the landing body 106 and the feedthrough line 118. For example, the landing body 106 includes an alignment guide 122 providing alignment functions for aligning the line connector 108 in the landing body 106 to the connector portion 120 in the tubing hanger 31. In the present embodiment, the alignment guide 122 include a key 124 and a stab mandrel 128. The key 124 (e.g., an axial key or guide) may be positioned in a key slot 126 (e.g., an axial key slot or guide). The key 124 may have flexibility of moving inside the key slot 126 before locking the landing body 106 with the lock 64 as discussed in further detail below. The key 124 may be an axially extending guide, such as an axially extending plate, strip, or rectangular bar. The key slot 126 may be an axially extending slot, groove, or recess sized to receive the key 124. In certain embodiments, the key 124 is coupled to the landing body 106 (e.g., along an outer annular surface) and the key slot 126 is disposed in the tubing hanger 31 (e.g., along an inner annular surface), or the key 124 is coupled to the tubing hanger 31 (e.g., along an inner annular surface) and the key slot 126 is disposed in the landing body 106 (e.g., along an outer annular surface). When lowering the feedthrough system cap 38A onto the subsea tree 22, the feedthrough system cap 38A may be rotated until the key 124 circumferentially aligns with the key slot 126, and then the feedthrough system cap 38A may be further lowered to fully land the landing body 106 on the tubing hanger 31 while the key 124 moves axially along the key slot 126. The circumferential alignment of the key 124 with the key slot 126 also circumferentially aligns the line connector 108 of the feedthrough system cap 38A with the connector portion 120 of the tubing hanger 31, thereby ensuring a proper connection for the feedthrough line 118. Upon engagement of the key 124 with the key slot 126, the landing body 106 is guided to move axially along the central axis 81 without any rotational movement in the circumferential direction 54 about the central axis 81. The alignment of the key 124 with the key slot 126 also blocks rotational movement of the landing body 106 when operating the actuator 60 to move the energizer 62 (e.g., energizing sleeve 98) to move the lock 64 between the locked and unlocked positions. In addition to the key 124 and the key slot 126, the stab mandrel 128 is configured to extend axially into an inner annular bore 127 of the tubing hanger 31 to provide alignment and sealing between the feedthrough system cap 38A and the tubing hanger 31. The stab mandrel 128 may be an annular stab mandrel having an outer annular surface 129 with one or more seals 131 (e.g., outer annular seals). In some embodiments, the stab mandrel 128 may not have a seal.

Once fully landed, the feedthrough system cap 38A may be locked to the subsea tree 22 by energizing the lock 64 between the landing body 106 and the tubing hanger 31 as discussed in further detail below. Before energizing the lock 64, the viewing window 80 may be used to view the position of the feedthrough system cap 38A relative to the subsea tree 22 and/or the indicator 102 may be used to confirm the position of the feedthrough system cap 38A. The subsea tree 22 also includes other features that may be used with the landing and locking of the feedthrough system cap 38A. For example, the subsea tree 22 includes a tree body or a reentry mandrel 130, a top 132 of the reentry mandrel 130, grooves 134 on the reentry mandrel 130, a top 140 of the tubing hanger 31, and steps 142 (e.g., annular steps) on the tubing hanger 31. These features may provide various supports for the installation of the feedthrough system cap 38A on the subsea tree 22.

Figure 3:
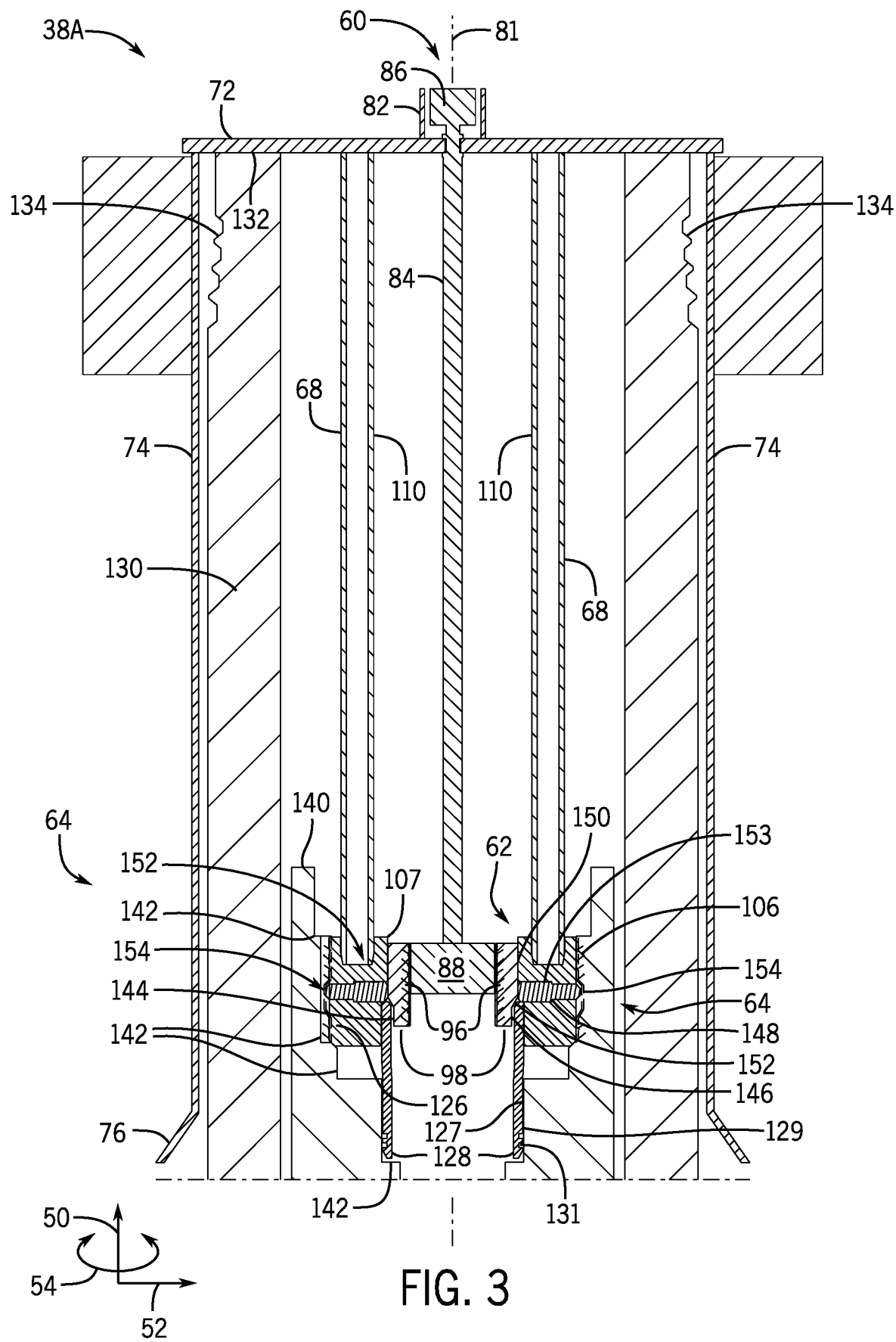
FIG. 3 is a cross-sectional view of an embodiment of the subsea tree taken along line 3-3 of FIG. 2.

FIG. 3 is a cross-sectional view of an embodiment of the subsea tree 22 taken along the line 3-3 of FIG. 1, further illustrating details of the lock 64 mentioned above. The feedthrough system cap 38A is the same as described above with reference to FIG. 2. However, the cross-sectional view of FIG. 3 is rotated about the central axis 81 relative to the cross-sectional view of FIG. 2. In the embodiment shown in FIG. 3, the energizer 62 (e.g., energizing sleeve 98) is configured to move the lock 64 radially between a first radial position (e.g., unlocked position) and a seconds radial position (e.g., locked position) relative to the tubing hanger 31. The energizing sleeve 98 is configured to drive the lock 64 via a variable diameter annular surface 144, which may function as a cam surface or energizing surface. The variable diameter annular surface 144 of the energizing sleeve 98 may include an annular surface 146, a tapered annular surface 148, and an annular surface 150, wherein the annular surface 150 has a greater diameter than the annular surface 146, and the tapered annular surface 148 (e.g., frustoconical surface or energizing surface) expands or increases in diameter from the annular surface 146 to the annular surface 150. For example, the annular surface 146 may be a cylindrical surface having a first constant diameter, the annular surface 150 may be a cylindrical surface having a second constant diameter, and the second constant diameter is greater than the first constant diameter. The illustrated lock 64 includes a plurality of radial locking pins or locking dogs 152 (e.g., radial locks) extending radially through bores, windows, or openings 153 in the landing body 106 from the energizing sleeve 98 to the tubing hanger 31. In certain embodiments, the lock 64 may include one or more radial locks, such as a locking ring (e.g., annular ring, split ring, C-ring, segmented ring, etc.), configured to expand and contract in the radial direction 52. The variable diameter annular surface 144 of the energizing sleeve 98 is configured to radially move the plurality of locking dogs 152.

As the actuator 60 (e.g., central shaft 84 and the bottom actuating portion 88) rotates within the energizing sleeve 98 via the threaded interface 96, the energizing sleeve 98 moves axially downward within the landing body 106 along the central axis 81 in the axial direction 50. As the energizing sleeve 98 moves axially downward, the variable diameter annular surface 144 moves along the plurality of locking dogs 152 from the annular surface 146, along the tapered annular surface 148, and along the annular surface 150. When the annular surface 146 is disposed against the plurality of locking dogs 152, the plurality of locking dogs 152 are disposed in the first radial position (e.g., unlocked position), wherein the plurality of locking dogs 152 are radially retracted within the openings 153 in the landing body 106. When the tapered annular surface 148 moves along the plurality of locking dogs 152 during axial downward movement of the energizing sleeve 98, the plurality of locking dogs 152 are gradually energized or biased in an outward radial direction 52 from the first radial position (e.g., unlocked position) toward the second radial position (e.g., locked position). After passing over the tapered annular surface 148, when the annular surface 150 is disposed against the plurality of locking dogs 152, the plurality of locking dogs 152 are disposed in the second radial position (e.g., locked position), wherein the plurality of locking dogs 152 are radially extended or protruding from the openings 153 in the landing body 106 to engage with the tubing hanger 31 (e.g., an annular slot or groove 154). For example, the annular slot or groove 154 may extend circumferentially about an inner annular surface of the tubing hanger 31, such that the plurality of locking dogs 152 can radially extend into the annular slot or groove 154 to block axial movement of the landing body 106 and the entire feedthrough system cap 38A. Again, the monitor 66 (e.g., the indicator 102 and the viewing window 80) may be used to confirm the locked position between the feedthrough system cap 38A and the tubing hanger 31. The locking dogs 152 may be disposed at a plurality of positions circumferentially offset from the feedthrough line 118, the protective feedthrough sleeve 68, the line connector 108, and related components.

The feedthrough system cap 38A can be unlocked and removed from the subsea tree 22 by operating the actuator 60, the energizer 62, and the lock 64 in a reverse process. For example, the actuator 60 may rotate the central shaft 84 and the bottom actuating portion 88 in an opposite rotational direction along the threaded interface 96, thereby driving movement of the energizing sleeve 98 in an opposite axial direction (e.g., upward axial direction), and causing the plurality of locking dogs 152 to retract from the annular slot or groove 154. In certain embodiments, the locking dogs 152 may be spring biased radially inward toward the energizing sleeve 98, such that the locking dogs 152 automatically retract into the openings 153 in the landing body 106 when moving the energizing sleeve 98 axially upwardly during a removal process. In certain other embodiments, the locking dogs 152 may be retracted by being forced inwards by the angled contact with groove 154 after the energizing sleeve 98 is moved axially upward. Once the locking dogs 152 are retracted from the annular slot or groove 154, the feedthrough system cap 38A may be pulled vertically upward to separate the feedthrough system cap 38A from the tubing hanger 31 and the subsea tree 22.

Figure 4:
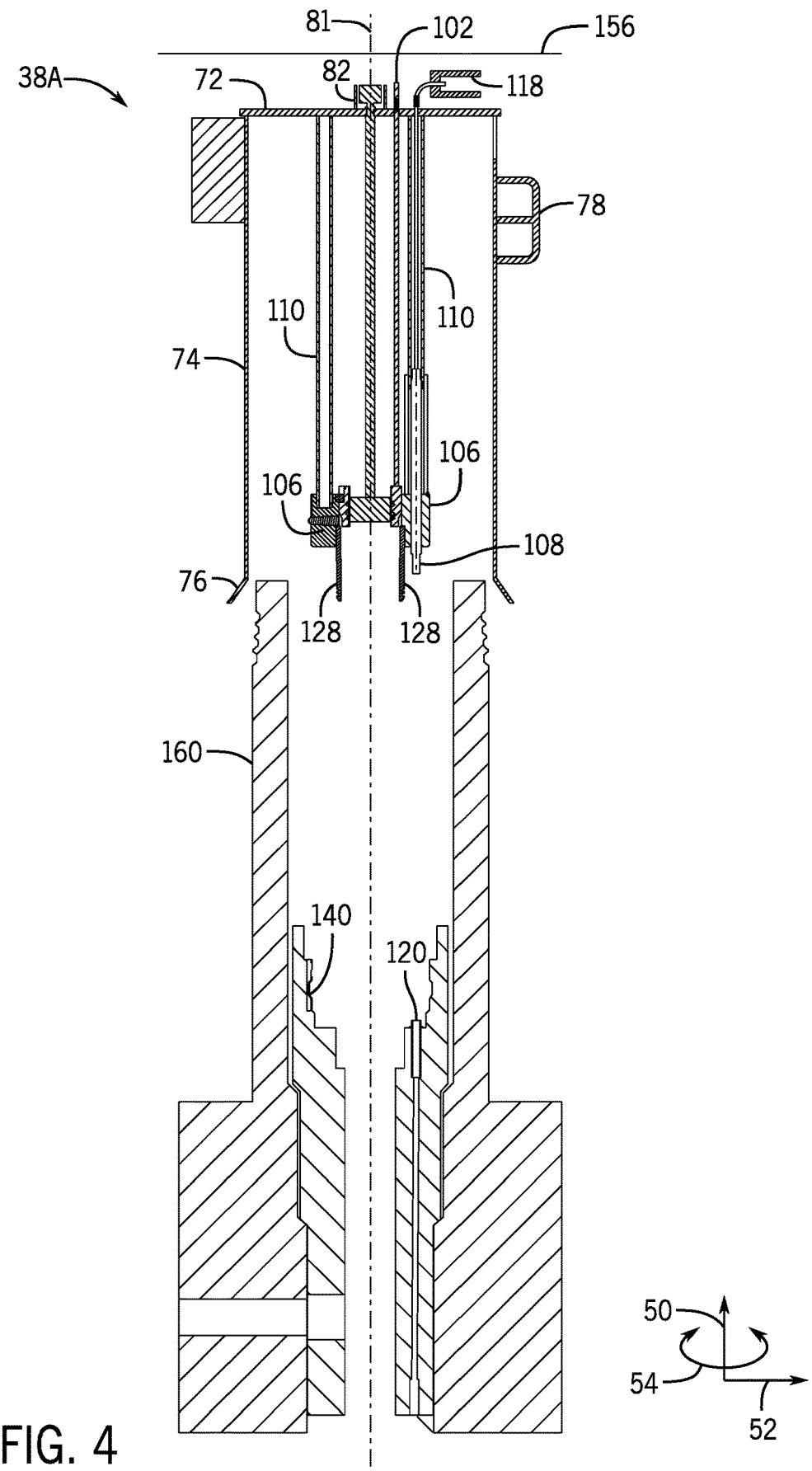
FIG. 4 is a cross-sectional view of an embodiment of the subsea tree of FIG. 2 in a position prior to installing the feedthrough system cap on the subsea tree.

FIG. 4 is a cross-sectional view of an embodiment of the feedthrough system cap 38A vertically above the subsea tree 22 of FIG. 2, illustrating the feedthrough system cap 38A in a position 156 prior to installation on the subsea tree 22, further illustrating details of the installation process. The feedthrough system cap 38A and the subsea tree 22 are the same as described above, and thus the foregoing discussion of various components, movements, and functionality is the same for FIG. 4. The ROV 40 may carry the feedthrough system cap 38A (e.g., using the handle 78) to a position where the top of the feedthrough system cap 38A (e.g., including the top 72 and the adapter 82) is in close proximity to the position 156, such that the guide funnel 70 is ready to be slid downward (e.g., outside and along the outer surface of the subsea tree 22). For instance, the inner side of the side wall 74 of the guide funnel 70 may be aligned for being slid downward along the reentry mandrel 130 in a top section of the subsea tree 22. As such, the guide funnel 70 may provide a first alignment (e.g., a rough or approximate alignment) for aligning the guide funnel 70 to the reentry mandrel 130, prior to installing the feedthrough system cap 38A. As noted above, the tapered bottom 76 provides the initial alignment between the guide funnel 70 and the reentry mandrel 130, followed by the side wall 74 of the guide funnel 70 moving axially along the reentry mandrel 130.

Figure 5:
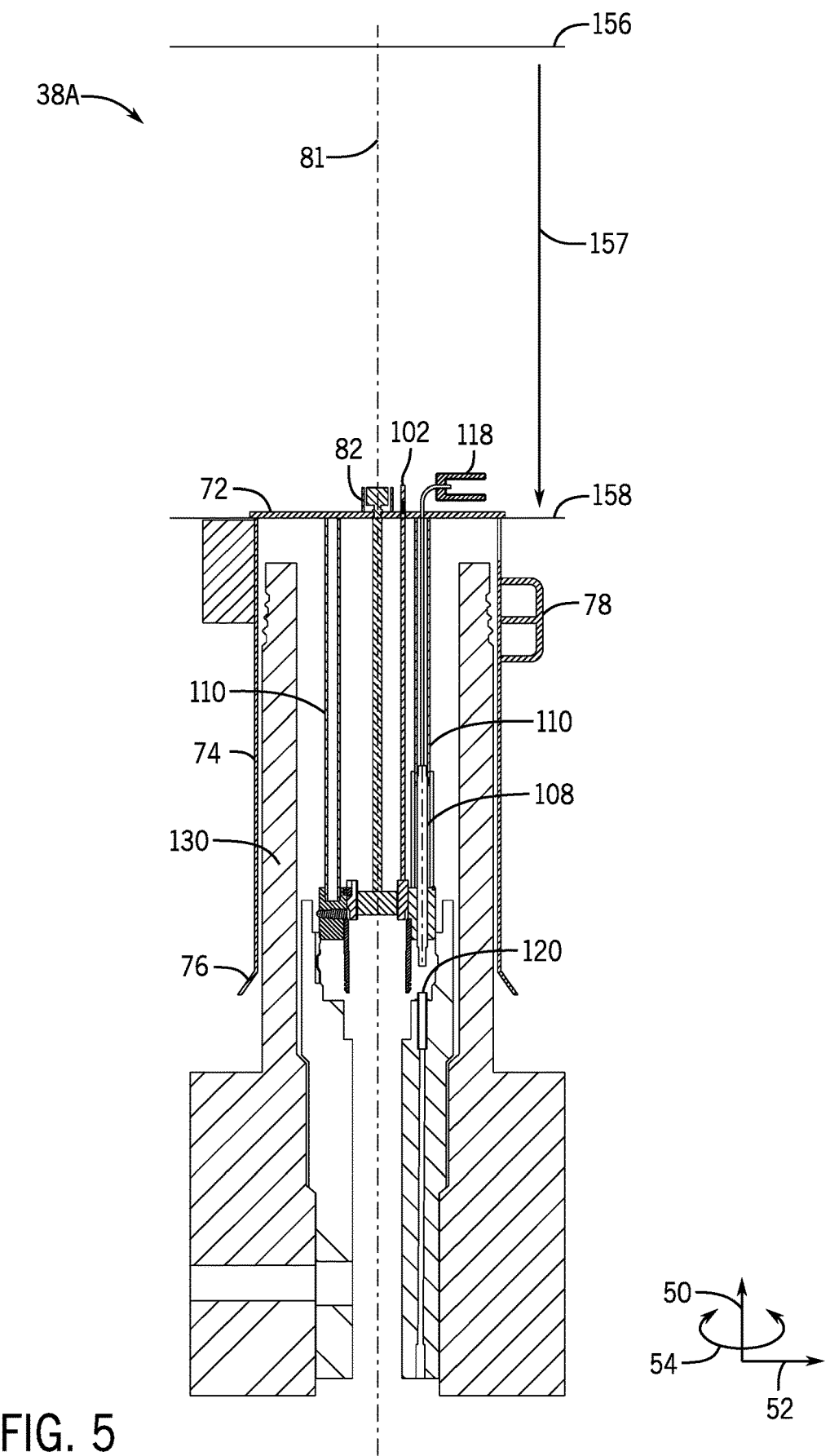
FIG. 5 is a cross-sectional view of an embodiment of the subsea tree of FIG. 2 in a position (e.g., partially lowered position) during installation of the feedthrough system cap on the subsea tree.

FIG. 5 is a cross-sectional view of an embodiment of the feedthrough system cap 38A during installation onto the subsea tree of FIG. 2, illustrating the feedthrough system cap 38A in a position 158 (e.g., a partially lowered position) prior to fully landing on the subsea tree 22, further illustrating details of the installation process. The feedthrough system cap 38A and the subsea tree 22 are the same as described above, and thus the foregoing discussion of various components, movements, and functionality is the same for FIG. 5. As shown, the guide funnel 70 is slid downward along a direction 157 (e.g., along the central axis 81) and reaches the position 158, such that the top 72 reaches the top 132 of the reentry mandrel 130. The feedthrough system cap 38A is rotated about the central axis 81 until the key 124 aligns with the key slot 126, and then the feedthrough system cap 38A is further lowered while the key 124 moves axially along the key slot 126. The alignment between the key 124 and the key slot 126 aligns the feedthrough line 118, and particularly the line connector 108 with the connector portion 120 in the tubing hanger 31. Once fully landed, the feedthrough system cap 38A may be locked in place via operation of the actuator 60, the energizer 62, and the lock 64 as discussed in detail above. The central shaft 84 may be rotated (e.g., via the top drive portion 86 positioned inside the adapter 82) hydraulically or mechanically (e.g., controlled by the ROV 40), causing a rotation of the central shaft 84 around the central axis 81, which subsequently drives the energizing sleeve 98 to move downwardly along the plurality of locking dogs 152 to move the locking dogs 152 into the locked position with the tubing hanger 31. The indicator 102 and/or the viewing window 80 may be used to verify the landing and locking as discussed above. It should be noted that the components described above with regard to the example subsea tree 22 with the feedthrough system cap 38A of FIGS. 2-5 are examples and the feedthrough system cap 38A may include additional or fewer components relative to the illustrated embodiment.

Figure 6:
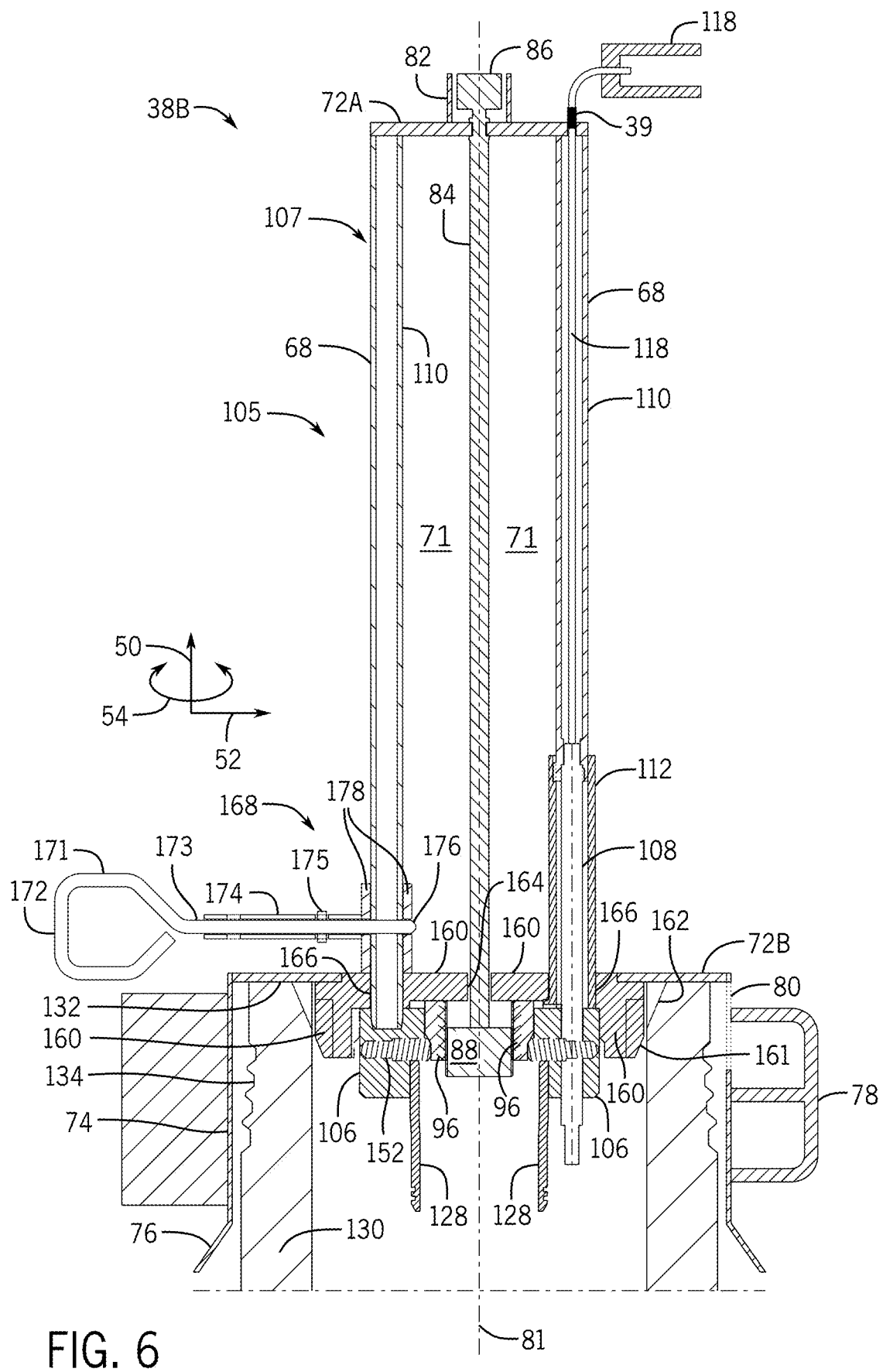
FIG. 6 is a cross-sectional view of an embodiment of a subsea tree with a feedthrough system cap, illustrated a retracted position of a moveable landing assembly.

The embodiment of the feedthrough system cap 38A described above with respect to FIGS. 2-5 includes a fixed landing body 106 (e.g., fixed in position relative to the guide funnel 70), such that the landing body 106 moves along with the guide funnel 70. Alternatively, the landing body may move separately from the guide funnel 70. FIG. 6 is a cross-sectional view of an embodiment of a feedthrough system cap 38B landed on the subsea tree 22. The feedthrough system cap 38B is similar to the feedthrough system cap 38A as described above with reference to FIGS. 1-5, and thus like elements are depicted with like element numbers. Unless stated otherwise, the various components, movements, and functionality are the same or substantially the same as described in detail above with reference to FIGS. 1-5, even if shown in different positions. For example, the actuator 60 (e.g., top drive portion 86, central shaft 84, and bottom actuating portion 88), the energizer 62 (e.g., energizing sleeve 98), and the lock 64 (e.g., locking dogs 152) operate substantially the same as described above with reference to FIGS. 1-5. By further example, the monitor 66 (e.g., the indicator 102 and/or the viewing window 80) may be configured to operate substantially the same as described above with reference to FIGS. 1-5. However, the feedthrough system cap 38B differs from the feedthrough system cap 38A by including a shorter side wall 74 of the guide funnel 70 and by including an axial positioning system 105 for extending and retracting the landing body 106 (e.g., extensible landing body) relative to the guide funnel 70. For example, the landing body 106 may be part of a moveable landing assembly 107 configured to move via the axial positioning system 105.

For example, the side wall 74 (e.g., annular side wall) of the feedthrough system cap 38B of FIG. 6 may be less than 10, 20, 30, 40, 50 percent, or other percentages of an axial length of the feedthrough system cap 38A of FIGS. 1-5. For example, the side wall 74 may have an axial length sufficient to surround the landing body 106, the energizer 62 (e.g., energizing sleeve 98), the lock 64 (e.g., locking dogs 152), and the stab mandrel 128 when the axial positioning system 105 positions the landing body 106 in a retracted position as shown in FIG. 6. The retracted position of FIG. 6 may be used when running the feedthrough system cap 38B to the subsea tree 22, thereby providing protection for the foregoing components within the side wall 74 of the guide funnel 70 prior to landing of the feedthrough system cap 38B. As illustrated in FIG. 6, the guide funnel 70 has been landed on the top 132 of the reentry mandrel 130; however, the landing body 106 has not yet been extended into the subsea tree 22.

The axial positioning system 105 includes a central guide body or guidance feature 160 (e.g., inner annular guide body) mounted in a central opening 71 of the top 72 of the guide funnel 70, wherein the guidance feature 160 includes a tapered annular edge 161 at an angle 162, a central guide bore 164 for the central shaft 84, radially offset guide bores 166 for the protective feedthrough sleeves 68, and an axial position lock 168. In the illustrated embodiment, the guidance feature 160 is configured to fit inside of an annular bore of the reentry mandrel 130, wherein the tapered annular edge 161 helps to guide the initial insertion of the guidance feature 160 into the reentry mandrel 130. The guidance feature 160 may also include a bumper (e.g., annular bumper) to protect surfaces of the reentry mandrel 130 (e.g., sealing surfaces). The bumper may be nylon or any other suitable material that would protect the surfaces of the reentry mandrel 130.

The axial position lock 168 is configured to move between an unlocked position enabling axial movement of a movable landing assembly 107 including the landing body 106 or a locked position blocking axial movement of the moveable landing assembly 107 including the landing body 106. The moveable landing assembly 107 includes a top portion 72A of the top 72 of the guide funnel 70, the top drive portion 86 disposed in the adapter 82, the central shaft 84 coupled to the top drive portion 86 and the bottom actuating portion 88, the protective feedthrough sleeves 68 (e.g., hollow axial tubes or axial guide bars) coupled to the top portion 72A and the landing body 106, the energizer 62 (e.g., energizing sleeve 98) coupled to the landing body 106 along the threaded interface 96, the lock 64 (e.g., locking dogs 152) coupled to the landing body 106, and the stab mandrel 128 coupled to the landing body 106. Collectively, the foregoing components of the moveable landing assembly 107 are configured to move axially along the central axis 81 when the axial position lock 168 is disposed in the unlocked position. The axial movement of the moveable landing assembly 107 is enabled and axially guided by movement of the central shaft 84 through the central guide bore 164 and movement of the protective feedthrough sleeves 68 through the offset guide bores 166. In certain embodiments, the central guide bores 164 and offset guide bores 166 may include bushings, bearings, or other supports to help reduce friction and axially guide the central shaft 84 and the protective feedthrough sleeves 68.

The axial position lock 168 includes a radial locking pin 172 disposed in a radial support sleeve 174 coupled to an axial guide sleeve 178, wherein the axial guide sleeve 178 includes a radial lock bore 176 aligned with the radial support sleeve 174. The radial locking pin 172 includes a handle 171 (e.g., loop) coupled to a shaft 173, wherein the shaft 173 is configured to move axially along the radial support sleeve 174 between a retracted position (e.g., unlocked position) out of the radial lock bore 176 in the axial guide sleeve 178 and an extended position (e.g., locked position) within the radial lock bore 176 in the axial guide sleeve 178. The axial guide sleeve 178 supports one of the protective feedthrough sleeves 68, which also includes a plurality of radial lock bores at different axial positions along the protective feedthrough sleeve 68 to enable different locking positions of the moveable landing assembly 107. In certain embodiments, the radial locking pin 172 may be spring biased with a spring (e.g., within the radial support sleeve 174 around the shaft 173) toward the extended position (e.g., locked position). Additionally, the radial locking pin 172 is configured to engage a pin retainer 175 to hold the position of the radial locking pin 172 within the radial support sleeve 174. For example, the pin retainer 175 may include a boss or protrusion disposed in a J-slot, such that radial locking pin 172 can be held in position or released from its position by a partial turn (e.g., ¼ turn or ½ turn) of the radial locking pin 172 in the radial support sleeve 174. In some embodiments, the radial locking pin 172 may be coupled to the radial support sleeve 174 via a threaded interface, such that the radial locking pin 172 can be extended or retracted by turning the radial locking pin 172 clockwise or counterclockwise along the threaded interface. In some embodiments, the radial locking pin 172 may be coupled to an actuator or drive, such as an electric drive or a fluid drive (e.g., hydraulic or pneumatic drive), coupled to a controller. In operation, the axial position lock 168 is used to lock or unlock the position of the movable landing assembly 107.

Figure 7:
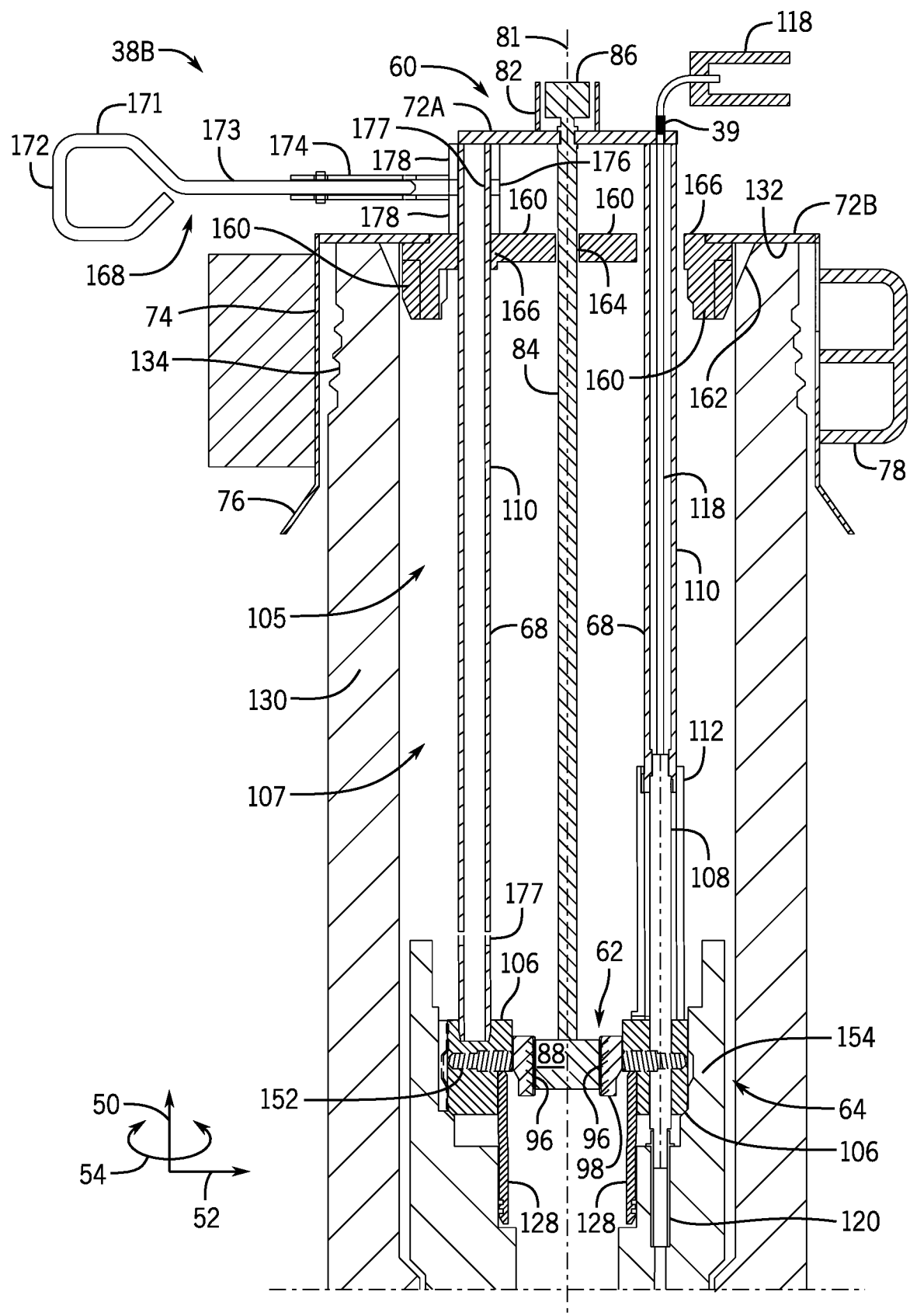
FIG. 7 is a cross-sectional view of an embodiment of the subsea tree of FIG. 6, illustrated an extended position of the moveable landing assembly.

FIG. 7 is a cross-sectional view of an embodiment of the feedthrough system cap 38B landed on the subsea tree 22 of FIG. 6, further illustrating the movable landing assembly 107 in an extended position within the subsea tree 22. As illustrated in FIG. 7, the axial position lock 168 has the radial locking pin 172 moved along the radial support sleeve 174 to a retracted position (e.g., unlocked position) relative to the radial lock bore 176 in the axial guide sleeve 178, such that the protective feedthrough sleeve 68 is free to move axially through the axial guide sleeve 178 and the movable landing assembly 107 is free to move axially from the retracted position of FIG. 6 to the extended position of FIG. 7. Again, when the axial position lock 168 is released or unlocked, the central shaft 84 moves axially through the central guide bore 164 of the guidance feature 160 and the protective feedthrough sleeves 68 move axially through the offset guide bores 166 of the guidance feature 160. As illustrated in FIG. 7, the protective feedthrough sleeve 68 has a plurality of radial lock bores 177 configured to align with the radial lock bore 176 and the radial locking pin 172 when locking a position of the protective feedthrough sleeve 68 and the movable landing assembly 107.

As illustrated in FIGS. 6 and 7, the landing body 106 may be run while nested in the feedthrough system cap 38B. The movable landing assembly 107, including the landing body 106, may then be released and extended (e.g., along the central axis 81) into the tubing hanger 31 after the portion 72B of the guide funnel 70 lands on the top 132 of the reentry mandrel 130. As discussed above with reference to FIGS. 1-5, the key 124 and the key slot 126 may be used to align the line connector 108 on the landing body 106 to the connector portion 120 on the tubing hanger 31. The landing body 106 may then be locked into the tubing hanger 31 using the actuator 60, the energizer 62, and the lock 64 in the same manner as described above with reference to FIGS. 1-5. Finally, the monitor 66 (e.g., indicator 102 and/or viewing window 80) may be used to monitor and/or confirm the status of landing, actuating, energizing, and/or locking the landing body 106. The passage and connection of the feedthrough line 118 is also as described in detail above with reference to FIGS. 1-5.

Figure 8:
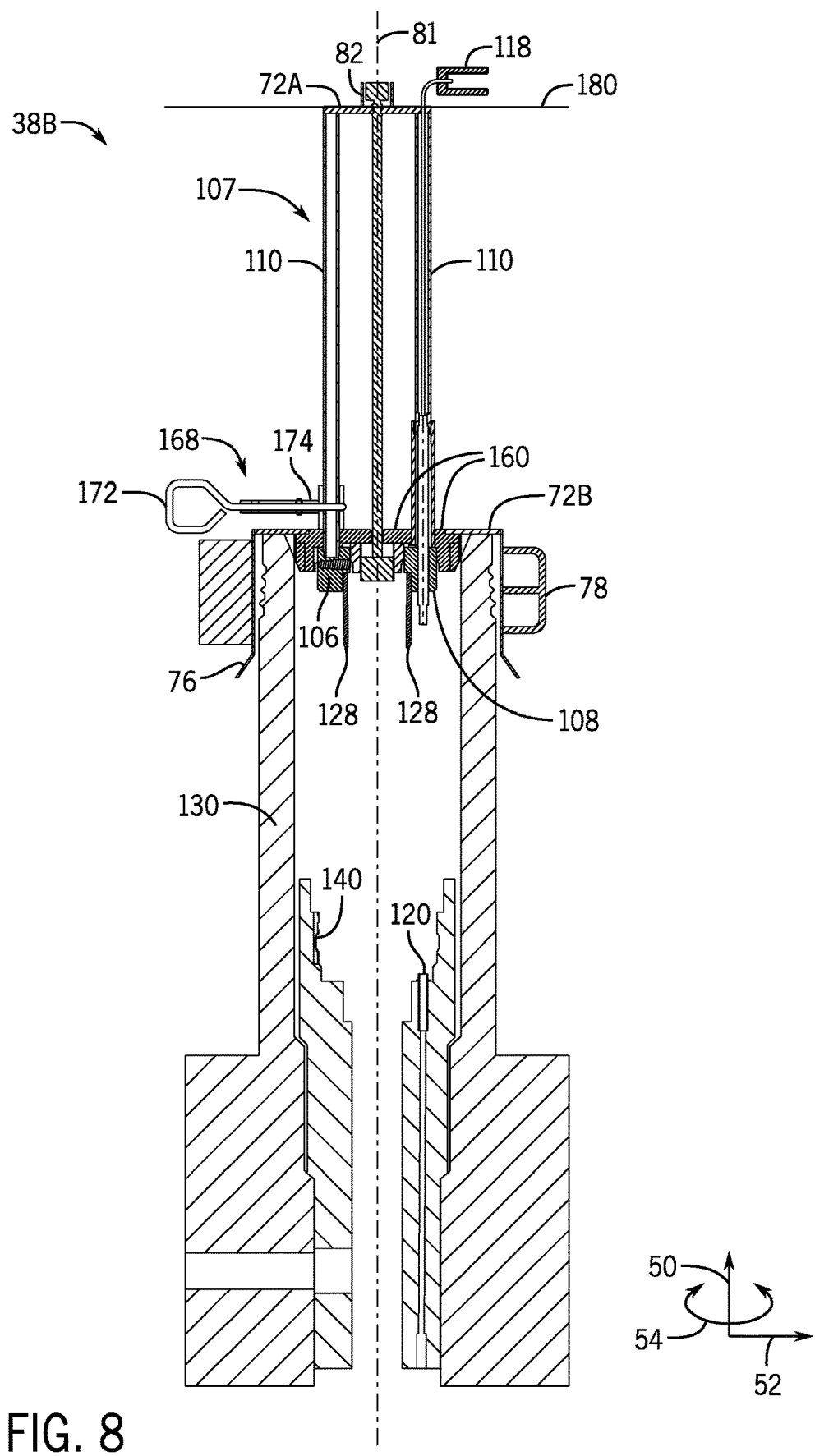
FIG. 8 is a cross-sectional view of an embodiment of the subsea tree of FIG. 6 in a position prior to installing the feedthrough system cap on the subsea tree.

FIG. 8 is a cross-sectional view of the feedthrough system cap 38B coupled to the subsea tree 22 of FIGS. 6 and 7, illustrating the feedthrough system cap 38B in a position prior to extending the moveable landing assembly 107 into the subsea tree 22. The ROV 40 may be configured to maneuver and lower the feedthrough system cap 38B onto the top 132 of the reentry mandrel 130, while the movable landing assembly 107 is locked in the retracted position using the axial position lock 168. The initial landing of the feedthrough system cap 38B onto the top 132 of the reentry mandrel 130 is guided at least by the tapered bottom 76 and the side wall 74 of the guide funnel 70 around an exterior of the reentry mandrel 130 and by the guidance feature 160 having the tapered annular edge 161 extending into the interior of the reentry mandrel 130. As such, the guide funnel 70 and the guidance feature 160 may provide the initial alignment for landing the feedthrough system cap 38B onto the reentry mandrel 130, prior to extending, actuating, energizing, and locking the moveable landing assembly 107 as described above.

Figure 9:
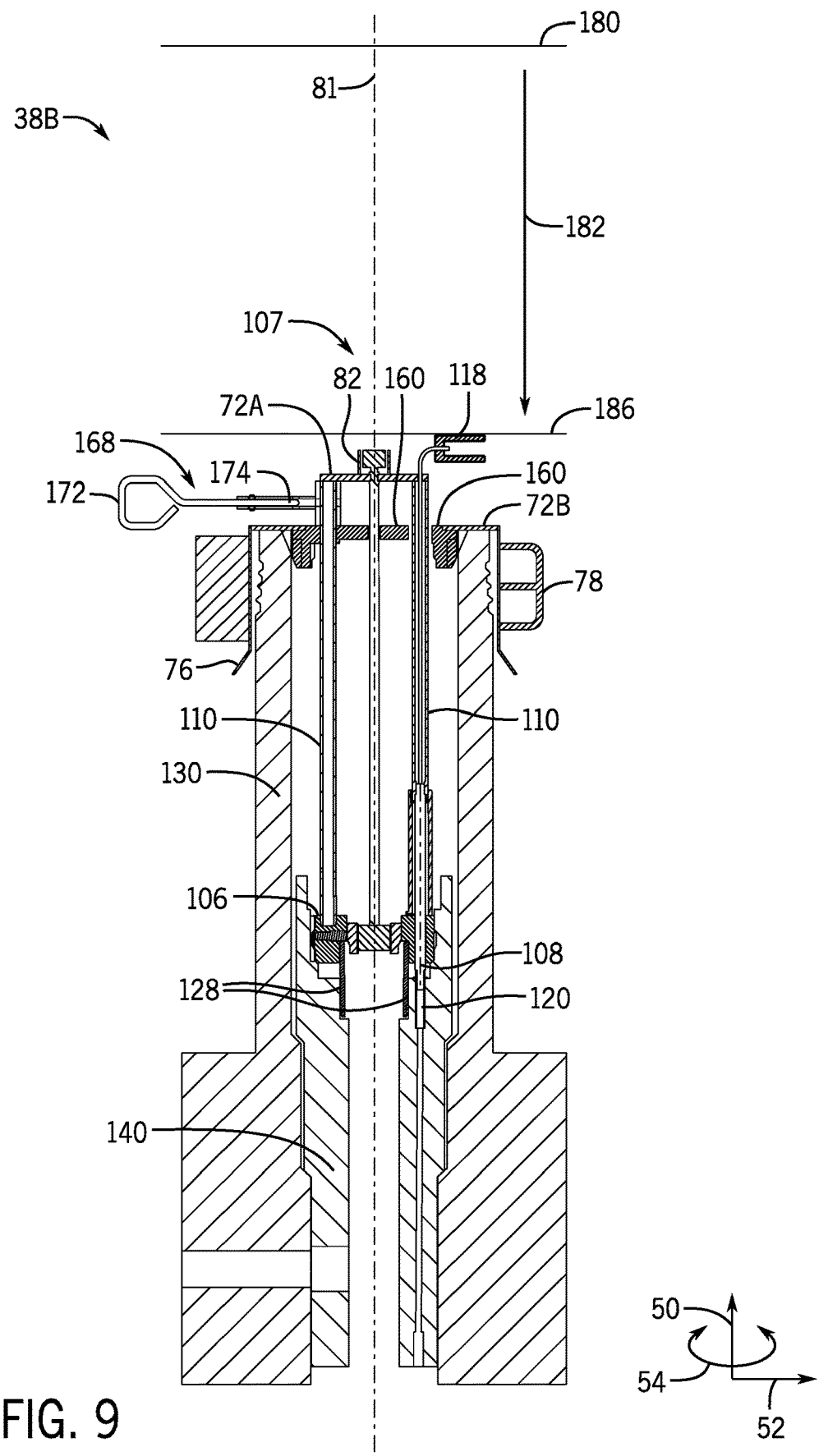
FIG. 9 is a cross-sectional view of an embodiment of the subsea tree of FIG. 6 in a position after installing the feedthrough system cap on the subsea tree.

FIG. 9 is a cross-sectional view of the feedthrough system cap 38B coupled to the subsea tree 22 of FIGS. 6-8, illustrating the feedthrough system cap 38B in a position after extending the moveable landing assembly 107 into the subsea tree 22. After landing the portion 72B on the top 132 of the reentry mandrel 130, the axial position lock 168 may release the moveable landing assembly 107, such that the moveable landing assembly 107 (including the landing body 106, the lock 64, the energizer 62, etc.) can be extended into the subsea tree 22 for landing and locking with the tubing hanger 31. As shown, the top portion 72A with the landing body 106 is slid downward along a direction 182 (e.g., along the central axis 81) from a position 180 (e.g., retracted position of FIG. 8) to a position 186 (e.g., extended position of FIG. 9), such that the top portion 72A aligns with portion 72B. After the moveable landing assembly 107 is extended into the subsea tree 22, the operation of the actuator 60, the energizer 62, and the lock 64 are substantially the same as described in detail above. Accordingly, after the top portion 72A reaches the position 186, the central shaft 84 may be rotated (e.g., via the top drive portion 86 positioned inside the adapter 82) via a torque tool (e.g., controlled by the ROV 40), causing a rotation of the central shaft 84 around the central axis 81, which subsequently drives the energizer 62 (e.g., energizing sleeve 98) to energize the lock 64 (e.g., locking dogs 152). For example, the central shaft 84 rotates the bottom actuating portion 88 along the threaded interface 96 with the energizing sleeve 98, thereby driving axial movement of the energizing sleeve 98 along the landing body 106 and the locking dogs 152 of the lock 64. The variable diameter annular surface 144 of the energizing sleeve 98 then drives radial movement of the locking dogs 152, particularly radial outward movement of the locking dogs 152 into the annular slot or groove 154. Again, the key 124 in the key slot 126 may be used to align the line connector 108 on the landing body 106 to the connector portion 120 on the tubing hanger 31. The monitor 66 (e.g., the indicator 102 and the viewing window 80) may be used to confirm the locked position between the feedthrough system cap 38A and the tubing hanger 31.

The embodiment illustrated in FIG. 8 shows a running position of the feedthrough system cap 38B. When the ROV 40 carries components of the feedthrough system cap 38B (e.g., during the installation), certain components (e.g., delicate components) in the landing body 106, such as the stab mandrel 128, the lock 64, and the guidance feature 160 need to be protected. The delicate components may be tucked inside the guide funnel 70 for protection. After the installation (e.g., as shown in FIG. 9), such delicate components may no longer need shielding by the guide funnel 70, because the components are shielded inside of the subsea tree 22. It should be noted that the components described above with regard to the subsea tree 22 with the feedthrough system cap 38B of FIGS. 6-9 are examples, and the feedthrough system cap 38B may include additional or fewer components relative to the illustrated embodiment.

Figure 10:
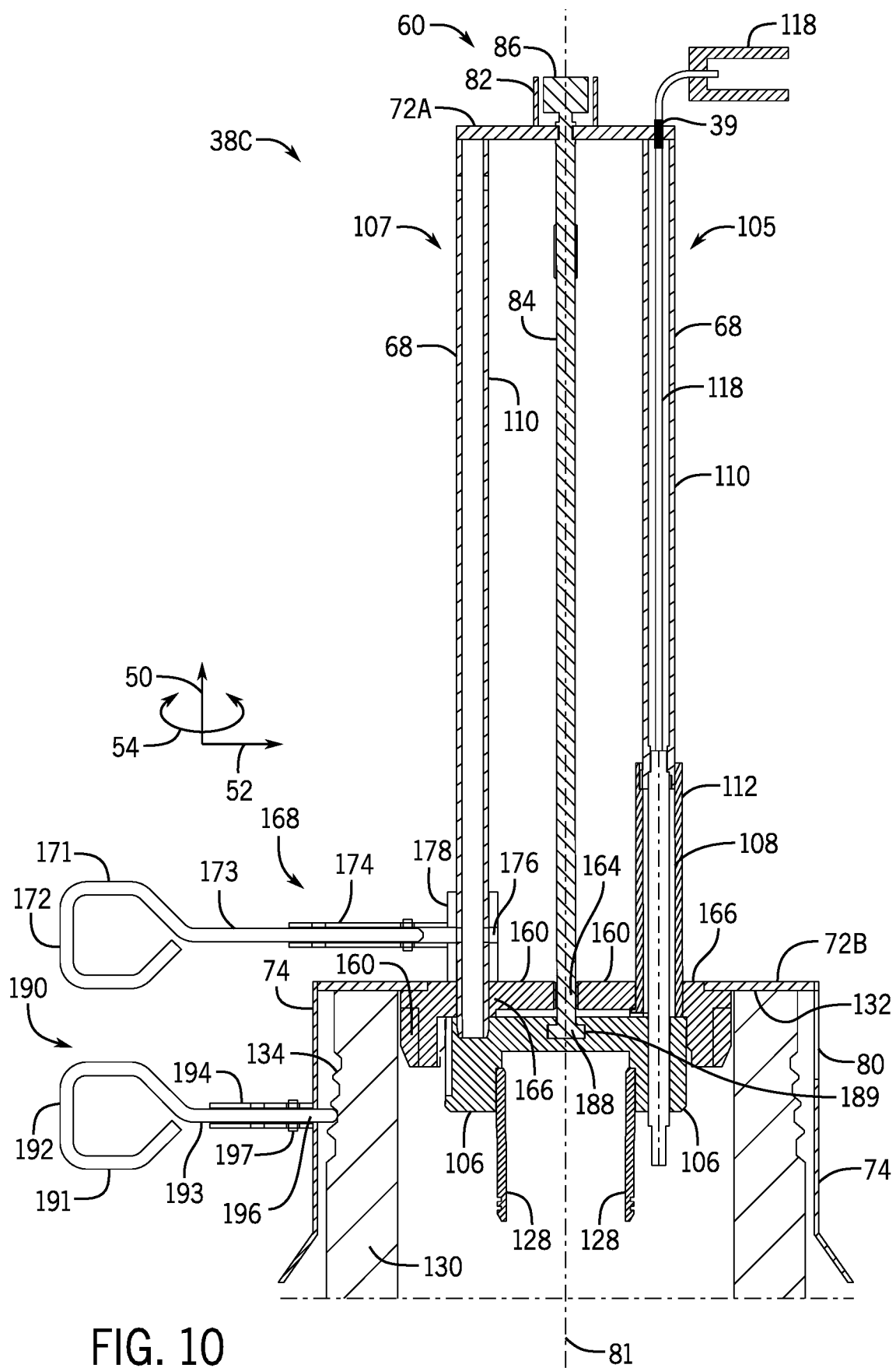
FIG. 10 is a cross-sectional view of an embodiment of a subsea tree with a feedthrough system cap, illustrated a retracted position of a moveable landing assembly and a locked position of an external landing lock.

FIG. 10 is a cross-sectional view of an embodiment of a feedthrough system cap 38C landed on the subsea tree 22. The feedthrough system cap 38C is similar to the feedthrough system cap 38A as described above with reference to FIGS. 1-5 and the feedthrough system cap 38B as described above with reference to FIGS. 6-9, and thus like elements are depicted with like element numbers. Unless stated otherwise, the various components, movements, and functionality are the same or substantially the same as described in detail above with reference to FIGS. 1-9, even if shown in different positions. For example, the axial position lock 168 is the same as described above with reference to FIGS. 6-9, the feedthrough system cap 38C has a shorter side wall 74 of the guide funnel 70 similar to the feedthrough system cap 38B of FIGS. 6-9, and the movable landing assembly 107 is the same or substantially the same as described above with reference to FIGS. 6-9. By further example, the monitor 66 (e.g., the indicator 102 and/or the viewing window 80) may be configured to operate substantially the same as described above with reference to FIGS. 1-5. Additionally, the feedthrough line 118 and the connection between the line connector 108 and the connector portion 120 may operate the same as discussed above.

The moveable landing assembly 107 may include and/or exclude any of the features discussed above with reference to FIGS. 6-9. In certain embodiments, the movable landing assembly 107 of FIG. 10 includes the top portion 72A of the top 72 of the guide funnel 70, the top drive portion 86 disposed in the adapter 82, the central shaft 84 coupled to the top drive portion 86 and the bottom actuating portion 88, the protective feedthrough sleeves 68 (e.g., hollow axial tubes or axial guide bars) coupled to the top portion 72A of the landing body 106, the energizer 62 (e.g., energizing sleeve 98) coupled to the landing body 106 along the threaded interface 96, the lock 64 (e.g., locking dogs 152) coupled to the landing body 106, and the stab mandrel 128 coupled to the landing body 106, as described above with reference to FIGS. 6-9. However, in some embodiments, the movable landing assembly 107 of FIG. 10 may exclude one or more of these components, such as the bottom actuating portion 88 of the actuator 60, the energizer 62 (e.g., energizing sleeve 98 coupled to the bottom actuating portion 88 via the threaded interface 96), and the lock 64 (e.g., locking dogs 152) energized by the energizer 62. In such embodiments, as illustrated in FIG. 10, the actuator 60 may have a coupling 188 disposed in a receptacle 189, wherein the coupling 188 is coupled to the central shaft 84 and the receptacle 189 is disposed in the landing body 106. The coupling 188 may include an enlarged head, a bearing, a bushing, or another joint. The receptacle 189 may include a keyhole slot, a flanged plate with a central opening, or another suitable retainer to couple the coupling 188 with the moveable landing assembly 107 (e.g., the landing body 106 or another suitable component of the moveable landing assembly 107). In certain embodiments, the actuator 60 or the handle 78 may be used to rotate the landing body 106 to help with alignment between the key 124 and the key slot 126, thereby aligning the feedthrough line 118 (e.g., the line connector 108 with the connector portion 120). In certain embodiments, the actuator 60 may be configured to control at least a portion of the movement of the landing body 106 when landing on the tubing hanger 31. Additionally, in certain embodiments, the central shaft 84 of the actuator may be coupled to the central guide bore 164 via a threaded interface, such that rotation of the central shaft 84 controls the axial movement of the moveable landing assembly 107 during a landing procedure.

In the illustrated embodiment, the feedthrough system cap 38C differs from the feedthrough system cap 38A of FIGS. 1-5 and the feedthrough system cap 38B of FIGS. 6-9 by including an external landing lock 190 configured to lock the feedthrough system cap 38C onto the subsea tree 22. The external landing lock 190 may be configured to operate with or without the internal landing lock of FIGS. 1-9 (e.g., inside the guide funnel 70 and inside the subsea tree 22), wherein the internal landing lock includes the lock 64 (e.g., locking dogs 152) driven by the energizer 62 (e.g., energizing sleeve 98). As illustrated in FIG. 10, the external landing lock 190 includes a radial locking pin 192 disposed in a radial support sleeve 194 coupled to the side wall 74 (e.g., annular side wall) of the guide funnel 70, wherein the side wall 74 includes a radial lock bore 196 aligned with the radial support sleeve 194. The radial locking pin 192 includes a handle 191 (e.g., loop) coupled to a shaft 193, wherein the shaft 193 is configured to move axially along the radial support sleeve 194 between a retracted position (e.g., unlocked position) and an extended position (e.g., locked position) relative to the groove 134 of the reentry mandrel 130. In the retracted position (e.g., unlocked position), the shaft 193 of the radial locking pin 192 is retracted within the radial support sleeve 194, such that the shaft 193 does not protrude into the groove 134 of the reentry mandrel 130. In the extended position (e.g., locked position), the shaft 193 of the radial locking pin 192 is extended at least partially outside of the radial support sleeve 194, such that the shaft 193 protrudes into the groove 134 of the reentry mandrel 130. In the extended position (e.g., locked position), the radial locking pin 192 blocks axial movement of the guide funnel 70, and thus the feedthrough system cap 38C, relative to the subsea tree 22. Additionally, while the external landing lock 190 (e.g., radial locking pin 192) secures the guide funnel 70, the axial position lock 168 can be released to enable lowering and landing of the landing body 106 onto the tubing hanger 31 and connection of the feedthrough line 118 (e.g., line connector 108 and connector portion 120).

In certain embodiments, the radial locking pin 192 may be spring biased with a spring (e.g., within the radial support sleeve 194 around the shaft 193) toward the extended position (e.g., locked position). Additionally, the radial locking pin 192 is configured to engage a pin retainer 197 to hold the position of the radial locking pin 192 within the radial support sleeve 194. For example, the pin retainer 197 may include a boss or protrusion disposed in a J-slot, such that radial locking pin 192 can be held in position or released from its position by a partial turn (e.g., ¼ turn or ½ turn) of the radial locking pin 192 in the radial support sleeve 194. In some embodiments, the radial locking pin 192 may be coupled to the radial support sleeve 194 via a threaded interface, such that the radial locking pin 192 can be extended or retracted by turning the radial locking pin 192 clockwise or counterclockwise along the threaded interface. In some embodiments, the radial locking pin 192 may be coupled to an actuator or drive, such as an electric drive or a fluid drive (e.g., hydraulic or pneumatic drive), coupled to a controller. In operation, the external landing lock 190 is used to lock or unlock the position of the guide funnel 70. Once locked, the axial position lock 168 can be released to lower the moveable landing assembly 107 as discussed below.

Figure 11:
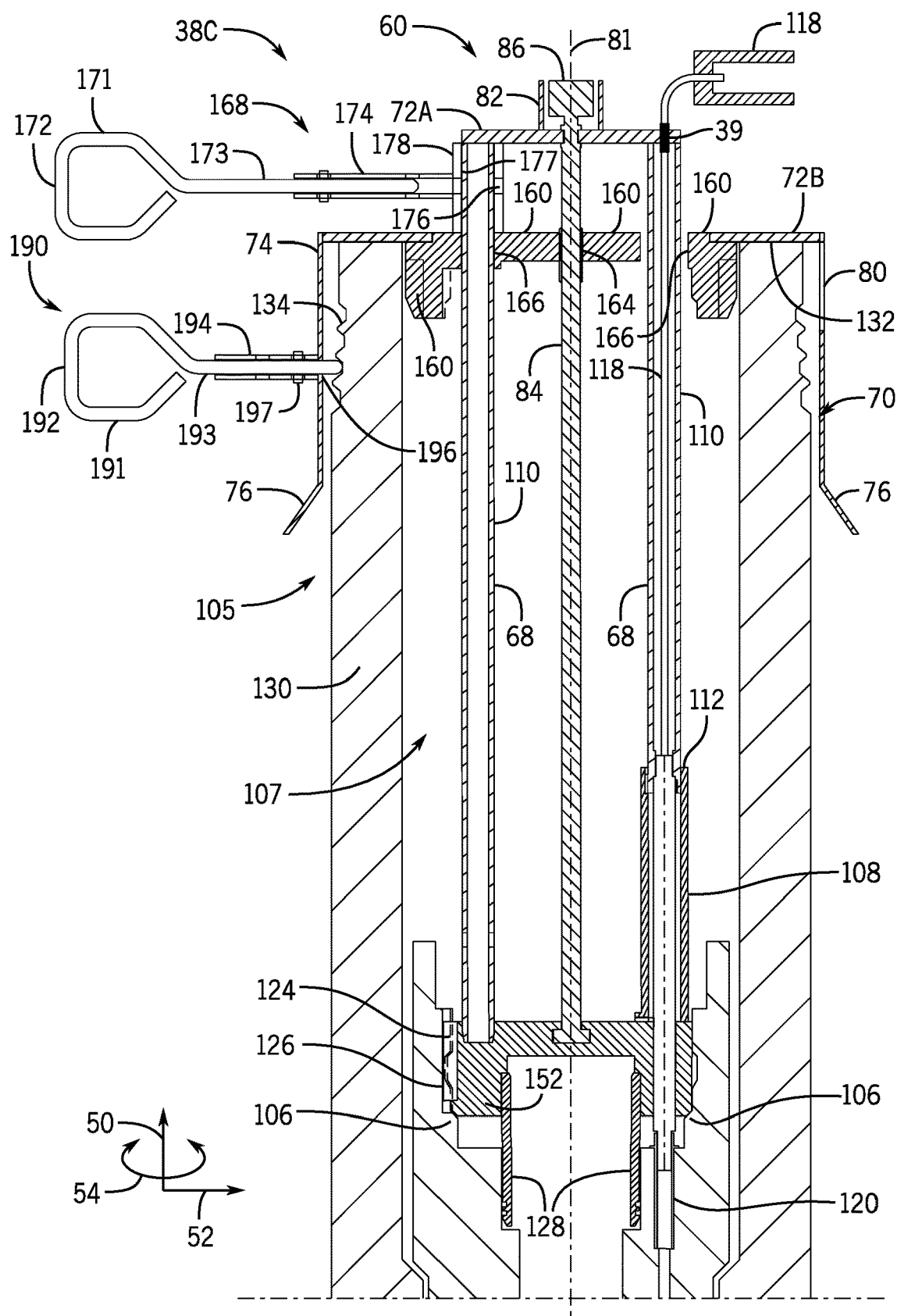
FIG. 11 is a cross-sectional view of an embodiment of the subsea tree of FIG. 10, illustrated an extended position of the moveable landing assembly.

FIG. 11 is a cross-sectional view of an embodiment of the feedthrough system cap 38C landed on the subsea tree 22 of FIG. 10, illustrating the movable landing assembly 107 extended into the subsea tree 22 and landed on the tubing hanger 31. As discussed above with reference to FIG. 10, the external landing lock 190 is disposed in a locked position to secure the guide funnel 70 and the feedthrough system cap 38C onto the reentry mandrel 130. As illustrated in FIG. 11, the axial position lock 168 has the radial locking pin 172 moved along the radial support sleeve 174 to a retracted position (e.g., unlocked position) relative to the radial lock bore 176 in the axial guide sleeve 178, such that the protective feedthrough sleeve 68 is free to move axially through the axial guide sleeve 178 and the movable landing assembly 107 is free to move axially from the retracted position of FIG. 10 to the extended position of FIG. 11. Again, when the axial position lock 168 is released or unlocked, the central shaft 84 moves axially through the central guide bore 164 of the guidance feature 160 and the protective feedthrough sleeves 68 move axially through the offset guide bores 166 of the guidance feature 160. As illustrated in FIG. 11, the protective feedthrough sleeve 68 has a plurality of radial lock bores 177 configured to align with the radial lock bore 176 and the radial locking pin 172 when locking a position of the protective feedthrough sleeve 68 and the movable landing assembly 107. Once the landing body 106 is at least substantially or fully extended and landed on the tubing hanger 31, the moveable landing assembly 107 may be locked in position by engaging a threaded interface between the central shaft 84 (e.g., external threads) and the central guide bore 164 (e.g., internal threads), wherein the threaded interface is gradually tightened by the rotation of the top drive portion 86. As the external landing lock 190 is latched to the grooves 134 of the reenter mandrel 13, the threaded interface between the central shaft 84 and the central guide bore 164 may affix the landing assembly 107 to the guide funnel 70. Again, as discussed above, the key 124 and the key slot 126 may be used to rotationally align the feedthrough line 118 (e.g., aligning and coupling the line connector 108 with the connector portion 120). The monitor 66 (e.g., indicator 102 and/or viewing window 80) also may be used to monitor and/or verify the landing of the landing body 106 on the tubing hanger 31 and the connection of the line connector 108 with the connector portion 120.

Figure 12:
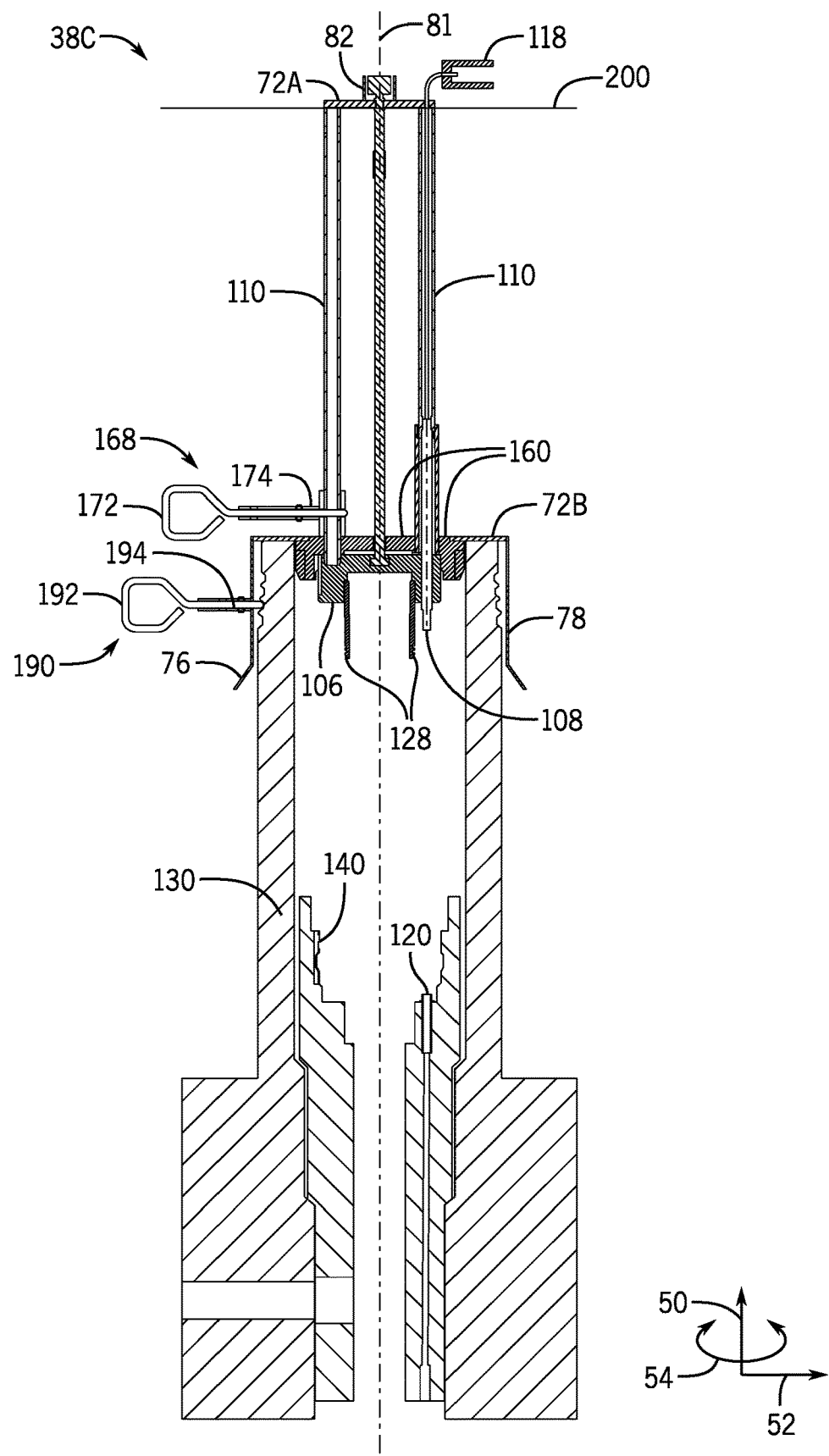
FIG. 12 is a cross-sectional view of an embodiment of the subsea tree of FIG. 10 in a position prior to installing the feedthrough system cap on the subsea tree.

FIG. 12 is a cross-sectional view of an embodiment of the feedthrough system cap 38C coupled to the subsea tree 22 of FIG. 10, illustrating the feedthrough system cap 38C in a position prior to extending the moveable landing assembly 107 into the subsea tree 22. The ROV 40 may be configured to maneuver and lower the feedthrough system cap 38B onto the top 132 of the reentry mandrel 130, while the movable landing assembly 107 is locked in the retracted position using the axial position lock 168. The initial landing of the feedthrough system cap 38C onto the top 132 of the reentry mandrel 130 is guided at least by the tapered bottom 76 and the side wall 74 of the guide funnel 70 around an exterior of the reentry mandrel 130 and by the guidance feature 160 having the tapered annular edge 161 extending into the interior of the reentry mandrel 130. As such, the guide funnel 70 and the guidance feature 160 may provide the initial alignment for landing the feedthrough system cap 38C onto the reentry mandrel 130. After landing the feedthrough system cap 38C on the reentry mandrel 130, the external landing lock 190 is configured to lock the feedthrough system cap 38C onto the reentry mandrel 130. After locking the feedthrough system cap 38C via the external landing lock 190, the axial position lock 168 is released to enable lowering and landing of the moveable landing assembly 107 on the tubing hanger 31 as described above. As such, the guide funnel 70 and the guidance feature 160 may provide the initial alignment for landing the feedthrough system cap 38C onto the reentry mandrel 130, prior to lowering and landing the moveable landing assembly 107 as described above.

Figure 13:
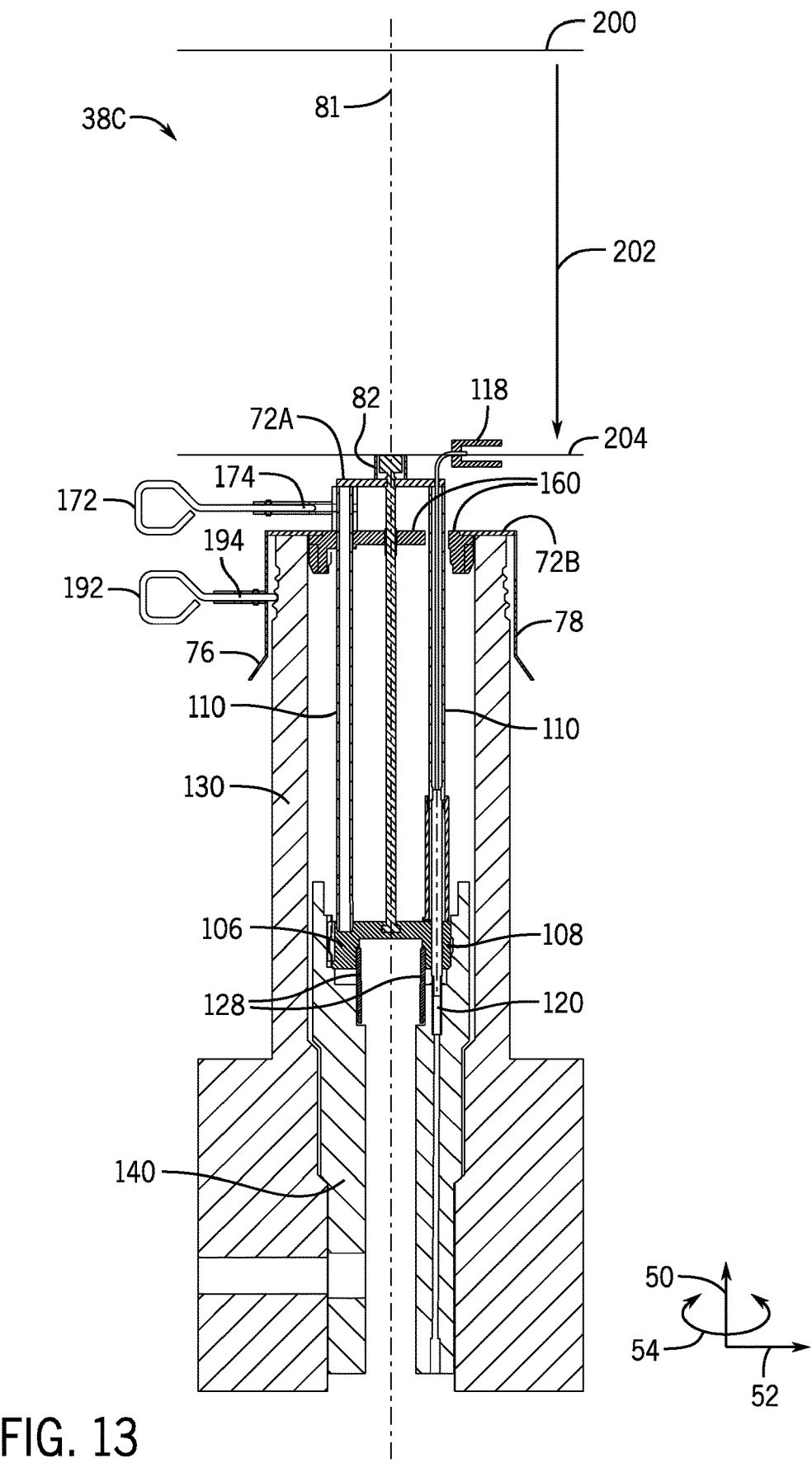
FIG. 13 is a cross-sectional view of an embodiment of the subsea tree of FIG. 10 in a position after installing the feedthrough system cap on the subsea tree.

FIG. 13 is a cross-sectional view of an embodiment of the feedthrough system cap 38C coupled to the subsea tree 22 of FIG. 10, illustrating the feedthrough system cap 38C in a position after extending the moveable landing assembly 107 into the subsea tree 22. After landing the portion 72B on the top 132 of the reentry mandrel 130, the axial position lock 168 may release the moveable landing assembly 107, such that the moveable landing assembly 107 (including the landing body 106) can be extended into the subsea tree 22 for landing with the tubing hanger 31. As shown, the top portion 72A with the landing body 106 is slid downward along a direction 202 (e.g., along the central axis 81) from a position 200 (e.g., retracted position of FIG. 12) to a position 204 (e.g., extended position of FIG. 13), such that the top portion 72A aligns with portion 72B. In certain embodiments, the central shaft 84 of the actuator 60 may be coupled to the central guide bore 164 via a threaded interface, such that rotation of the central shaft 84 controls the axial movement of the moveable landing assembly 107 during a landing procedure. Additionally, the key 124 in the key slot 126 may be used to align the line connector 108 on the landing body 106 to the connector portion 120 on the tubing hanger 31. Additionally, the monitor 66 (e.g., the indicator 102 and the viewing window 80) may be used to confirm the landing position of the landing body 106 on the tubing hanger 31 and the connection of the line connector 108 with the connector portion 120 of the feedthrough line 118.

Figure 14:
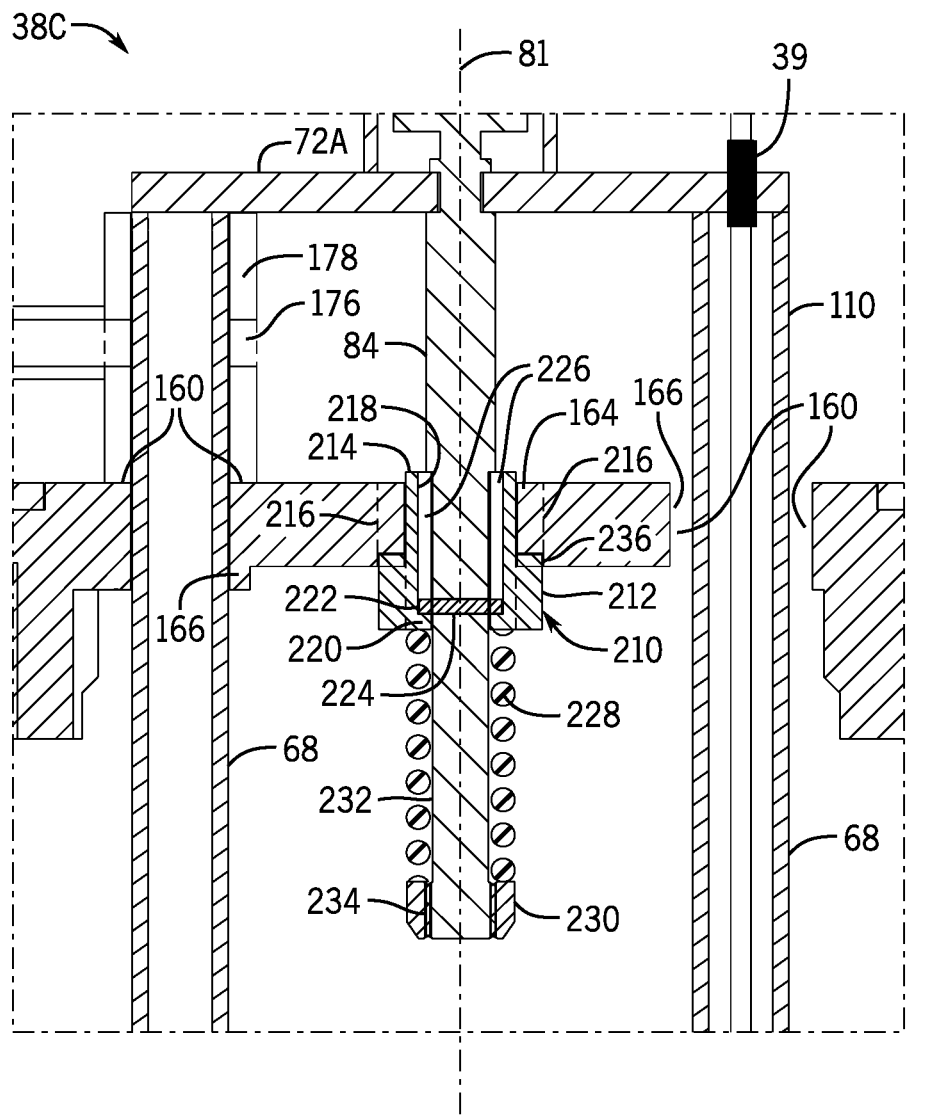
FIG. 14 is a partial cross-sectional view of another embodiment of the subsea tree of FIG. 10, illustrating a modification to the central shaft of the actuator.

FIG. 14 is a partial cross-sectional view of an embodiment of the feedthrough system cap 38C of FIGS. 10-13, further illustrating details of the central shaft 84 coupled to the guidance feature 160. In the illustrated embodiment, the central shaft 84 is coupled to the guidance feature 160 with a keyed ring 210 having a plurality of keys 212 extending from an annular body 214, wherein the plurality of keys 212 may be axially oriented keys (e.g., rectangular strips, plates, or fins) on opposite sides of the annular body 214. The keys 212 are configured to selectively align with mating key slots 216 (e.g., axially oriented key slots) along the central guide bore 164. The keyed ring 210 also includes a central bore 218 with an annular shoulder 220, wherein an opening diameter of the annular shoulder 220 is smaller than the diameter of the central bore 218. Thus, the keyed ring 210 is configured to selectively pass the central shaft 84 through the guidance feature 160 during a landing process, thereby helping to control the landing of the landing body 106 on the tubing hanger 31.

A retainer 222 is coupled to the central shaft 84 at a retainer slot 224. In certain embodiments, the retainer 222 includes a radial pin disposed in the retainer slot 224, which may be a radial pin hole in the central shaft 84, such that the retainer 222 (e.g., radial pin) protrudes from opposite sides of the central shaft 84. The retainer 222 is coupled to and moves with the central shaft 84. In certain embodiments, the retainer 222 (e.g., radial pin) engages with axial slots 226 along the central bore 218 of the keyed ring 210, such that rotation of the central shaft 84 causes rotation of the keyed ring 210. In this manner, the central shaft 84 can rotate the keyed ring 210 to align or misalign the keys 212 with the key slots 216. When the keys 212 are aligned with the key slots 216, then the keyed ring 210 and the central shaft 84 can pass through the guidance feature 160. For example, prior to a landing process, the central shaft 84 having the keyed ring 210 may be positioned vertically above and separate from the guidance feature 160. During the landing process, as the moveable landing assembly 107 is lowered onto the tubing hanger 31, the keyed ring 210 may abut a top side of the guidance feature 160. However, the keyed ring 210 cannot pass through the guidance feature 160 until the keys 212 align with the key slots 216. The central shaft 84 is then rotated until the keys 212 align with the key slots 216, and then the central shaft 84 is lowered to pass through the central guide bore 164 with the keyed ring 210. Upon passing through the guidance feature 160, the central shaft 84 may be rotated to move the keys 212 out of alignment with the key slots 216, such that the keyed ring 210 cannot pass upwardly back through the guidance feature 160.

The central shaft 84 further includes a spring 228 (e.g., an annular spring or coil spring) and a nut 230 coupled to a lower shaft portion 232. For example, the nut 230 is coupled to a threaded portion 234 of the lower shaft portion 232, and the spring 228 is disposed about the lower shaft portion 232 between the nut 230 and the keyed ring 210. In operation, the spring 228 biases the central shaft 84 in a downward direction toward the landing position of the landing body 106 on the tubing hanger 31, thereby helping to provide a spring bias to maintain the landing position. In certain embodiments, such as illustrated in FIG. 14, the downward movement of the moveable landing assembly 107 may be limited by the top portion 72A abutting on the top of the axial guide sleeve 178, such that the keys 212 may remain at least partially in the key slots 216. Furthermore, in certain embodiments, the keys 212 may remain in one or more groove 236 (e.g., an annular groove or separate partial circumferential grooves) in the guidance feature 160. For example, each key 212 may be rotated a partial turn (e.g., ¼ turn or ½ turn) along a respective groove 236, thereby axially retaining the keyed ring 210. It should be noted that the components described above with regard to the feedthrough system cap 38C of FIGS. 10-14 are examples and the feedthrough system cap 38C may include additional or fewer components relative to the illustrated embodiment.

Any of the previously described embodiments may further include an adjustable length on the protective feedthrough sleeves 68 (e.g., sleeve portions 110 and 112) that support the landing body 106 and pass one or more feedthrough lines 118 (as shown in FIGS. 2-13). Adjustment features in the protective feedthrough sleeves 68 may allow the protective feedthrough sleeves 68 to be lengthened or shortened prior to running subsea to allow a feedthrough system cap design or configuration to be used on different trees having varying reentry mandrel lengths.

Any of the previously described embodiments may use the protective feedthrough sleeves 68 to pass through any number and type of feedthrough lines 118, including fiber optic lines, electrical lines, fluid lines (e.g., liquid and/or gas lines), control lines, data communication lines, sensor or monitoring lines, chemical injection lines, or any combination thereof. Similarly, the line connector 108 and the connector portion 120 may include any combination of male and female connectors for the foregoing line types. Additionally, any of the features discussed above with reference to FIGS. 1-14 may be used alone or in combination with one another.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described to best explain the principals of the disclosure and its practical applications, to thereby enable others skilled in the art to best utilize the disclosure and various embodiments with various modifications as are suited to the particular use contemplated.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. § 112 (f). However, for any claims containing elements designated in any other manner, it is intended that such elements are not to be interpreted under 35 U.S.C. § 112 (f).

The invention claimed is:

1. A system, comprising:
a feedthrough cap, comprising:
a top configured to extend across an axial opening of a tree body of a well system;
a landing body configured to extend into the tree body; and
a feedthrough line configured to extend through the feedthrough cap; and
an axial positioning system configured to move a moveable landing assembly relative to the top of the feedthrough cap, the moveable landing assembly comprises the landing body.

2. The system of claim 1, wherein the feedthrough line comprises one or more fiber optic feedthrough lines, one or more electrical feedthrough lines, or a combination thereof.

3. The system of claim 1, wherein the feedthrough line comprises a line connector configured to couple with a connector portion on a hanger disposed in the tree body.

4. The system of claim 1, wherein the feedthrough cap comprises a guide funnel having the top and a side wall configured to extend about the tree body.

5. The system of claim 1, wherein the feedthrough line extends through the top, through a protective feedthrough sleeve, and through the landing body.

6. The system of claim 1, comprising a lock configured to couple the feedthrough cap to the tree body or a component inside of the tree body.

7. The system of claim 6, wherein the lock comprises an external landing lock configured to couple the feedthrough cap to an exterior of the tree body.

8. The system of claim 7, wherein the external landing lock comprises a radial locking pin.

9. The system of claim 6, wherein the lock comprises an internal landing lock configured to couple the landing body to the component inside of the tree body.

10. The system of claim 9, wherein the internal landing lock comprises one or more radial locks coupled to the landing body.

11. The system of claim 10, comprising an actuator having a shaft coupled to an actuating portion coupled to an energizing sleeve along a threaded interface, wherein the actuator is configured to rotate the actuating portion to drive axial movement of the energizing sleeve along the one or more radial locks, and the energizing sleeve is configured to drive the one or more radial locks in a radial direction between unlocked and locked position relative to a groove in the component.

12. The system of claim 1, wherein the landing body is disposed in a fixed axial position relative to the top of the feedthrough cap.

13. The system of claim 1, wherein the moveable landing assembly comprises an internal landing lock coupled to the landing body.

14. The system of claim 1, wherein the feedthrough cap comprises an external landing lock.

15. The system of claim 1, wherein the landing body is configured to align with a component inside of the tree body via a key disposed in a slot.

16. The system of claim 1, comprising a viewing window disposed in the feedthrough cap.

17. The system of claim 1, comprising an indicator coupled to an indicator shaft extending between the landing body and the top of the feedthrough cap, wherein the indicator extends through the top of the feedthrough cap.

18. A system, comprising:
a feedthrough cap, comprising:
a top configured to extend across an axial opening of a tree body of a well system;
a landing body configured to move between a retracted position and an extended position relative to the top of the feedthrough cap, wherein the extended position is configured to extend into the tree body; and
one or more feedthrough lines configured to extend through the top of the feedthrough cap, wherein the one or more feedthrough lines comprise one or more fiber optic feedthrough lines, one or more electrical feedthrough lines, or a combination thereof.

19. A method, comprising:
positioning a top of a feedthrough cap across an axial opening of a tree body of a well system;
moving a landing body between a retracted position and an extended position relative to the top of the feedthrough cap, wherein the extended position is configured to extend into the tree body; and
extending one or more feedthrough lines through the top of the feedthrough cap, wherein the one or more feedthrough lines comprise one or more fiber optic feedthrough lines, one or more electrical feedthrough lines, or a combination thereof.

* * * * *